US011853015B2

(12) United States Patent
Atmatzakis et al.

(10) Patent No.: US 11,853,015 B2
(45) Date of Patent: Dec. 26, 2023

(54) WRIST WORN ELECTRONIC DEVICE WITH SWITCHABLE MULTI BAND ANTENNA SYSTEM

(71) Applicant: Garmin Switzerland GmbH, Schaffhausen (CH)

(72) Inventors: Georgios Atmatzakis, Olathe, KS (US); Abu T. Sayem, Overland Park, KS (US); Juhi H. Godhwani, Lenexa, KS (US)

(73) Assignee: Garmin Switzerland GmbH

( * ) Notice: Subject to any disclaimer, the term of this patent is extended or adjusted under 35 U.S.C. 154(b) by 526 days.

(21) Appl. No.: 17/194,557

(22) Filed: Mar. 8, 2021

(65) Prior Publication Data

US 2022/0283551 A1 Sep. 8, 2022

(51) Int. Cl.
*G04R 60/08* (2013.01)
*H01Q 1/24* (2006.01)
*G01S 19/14* (2010.01)
*H01Q 1/27* (2006.01)

(52) U.S. Cl.
CPC .............. *G04R 60/08* (2013.01); *G01S 19/14* (2013.01); *H01Q 1/241* (2013.01); *H01Q 1/273* (2013.01)

(58) Field of Classification Search
CPC .. H01Q 3/26; H01Q 5/50; H01Q 5/00; H01Q 9/0442
See application file for complete search history.

(56) References Cited

U.S. PATENT DOCUMENTS

| 9,172,148 B2 | 10/2015 | Lyons et al. |
| 9,257,740 B2 | 2/2016 | Lyons et al. |
| 10,271,299 B1 | 4/2019 | Sayem et al. |
| 10,276,925 B2 | 4/2019 | Han et al. |
| 10,581,145 B2 | 3/2020 | Han et al. |

(Continued)

FOREIGN PATENT DOCUMENTS

WO 2018183678 A1 10/2018

OTHER PUBLICATIONS

U.S. Appl. No. 16/781,691, filed Feb. 4, 2020.

(Continued)

*Primary Examiner* — Renee S Luebke
*Assistant Examiner* — Matthew Hwang
(74) *Attorney, Agent, or Firm* — Samuel M. Korte; Max M. Ali

(57) ABSTRACT

A wrist-worn electronic device comprises a bezel, an antenna, and an aperture tuning network. The bezel is formed at least partially from electrically conductive material and positioned along a side wall of a housing of the device. The antenna includes a first aperture and a second aperture which are formed by various portions of the bezel. The antenna is configured to operate in one of two operating modes including a dual band mode in which the first aperture receives a first global navigation satellite system (GNSS) wireless signal at a first frequency band and the second aperture receives a second GNSS wireless signal at a second frequency band, and a single band mode in which the first aperture and the second aperture each receive the first GNSS wireless signal. The aperture tuning network has an adjustable configuration wherein adjustment of the adjustable configuration changes the operating mode of the antenna.

20 Claims, 20 Drawing Sheets

(56) References Cited

U.S. PATENT DOCUMENTS

| | | |
|---|---|---|
| 10,944,158 B2 | 3/2021 | Sayem et al. |
| 10,971,805 B2 | 4/2021 | Kenkel et al. |
| 2017/0214422 A1* | 7/2017 | Na .......................... H01Q 7/00 |
| 2019/0131696 A1 | 5/2019 | Hanshew et al. |
| 2019/0379122 A1* | 12/2019 | Kenkel ................. G06F 1/1698 |

OTHER PUBLICATIONS

U.S. Appl. No. 17/235,618, filed Apr. 20, 2021.
Garmin GPSMAP 66SR https://buy.garmin.com/en-US/US/p/707627/pn/010-02431-00, published prior to Mar. 8, 2021.

* cited by examiner

WRIST WORN ELECTRONIC DEVICE WITH SWITCHABLE MULTI BAND ANTENNA SYSTEM

BACKGROUND

A wrist-worn electronic device is typically utilized by people who are walking, jogging, running, biking, hiking, backpacking, camping, mountain climbing, geocaching, or the like. The electronic device includes an antenna, a location determining element, and a screen. The antenna receives a global navigation satellite system (GNSS) signal and communicates it to the location determining element which processes the signal in order to determine a geolocation of the device. The screen displays the geolocation on a map to help the user know his location in relation to geographic surroundings. When the electronic device is utilized in locations that include buildings, houses, towers, rock formations, cliff faces, or other manmade or natural structures with large flat surfaces, the GNSS signal often reflects off of the surfaces. The reflections are received by the antenna in addition to the antenna receiving the GNSS signal directly. This situation creates multipath interference which greatly decreases the accuracy of the determination of the geolocation. In other words, the location determining element may determine that the electronic device is at a particular location when the electronic device is actually at a different location, perhaps dozens of feet away.

SUMMARY

Embodiments of the present technology provide a wrist-worn electronic device with a multiple mode, multiple frequency band antenna configuration, wherein the electronic device can selectively switch between modes. In a first mode, the electronic device receives and processes multiple frequency band signals, which improves the accuracy of the determination of a geolocation of the electronic device. In a second mode, the electronic device receives and processes a single frequency band signal, which reduces power consumption. The electronic device broadly comprises a housing, a bezel, an antenna, and an aperture tuning network. The housing includes a bottom wall configured to contact a wearer's wrist and a side wall coupled to the bottom wall. The bezel is annular shaped, formed at least partially from electrically conductive material, and positioned along an upper edge of the side wall. The antenna includes a first aperture and a second aperture and is configured to operate in one of two operating modes including a dual band mode and a single band mode. In the dual band mode, the first aperture receives a first global navigation satellite system (GNSS) wireless signal at a first frequency band and is formed by a first portion of a circumference of the bezel, and the second aperture receives a second GNSS wireless signal at a second frequency band and is formed by a second portion of the circumference of the bezel. In the single band mode, the first aperture and the second aperture each receive the first GNSS wireless signal. The first aperture is formed by the first portion of the circumference of the bezel, and the second aperture is formed by a third portion of the circumference of the bezel located within the second portion of the circumference of the bezel. The aperture tuning network has an adjustable configuration wherein adjustment of the adjustable configuration changes the operating mode of the antenna.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 6A is a top view of the wrist-worn electronic device with the display removed to expose a printed circuit board within the housing, wherein FIG. 6A depicts a path for a first frequency band electronic signal;

FIG. 6B is a top view of the wrist-worn electronic device with the display removed to expose the printed circuit board within the housing, wherein FIG. 6B depicts a path for a second frequency band electronic signal;

FIG. 6C is a top view of the wrist-worn electronic device with the display removed to expose a printed circuit board within the housing, wherein FIG. 6C depicts a path for the first frequency band electronic signal in a different mode from the mode of electronic device of FIG. 6A;

FIG. 11A is a top view of the second embodiment of the wrist-worn electronic device with the display removed to expose a printed circuit board within the housing, wherein FIG. 11A depicts a path for a first frequency band electronic signal;

Figure 11A:
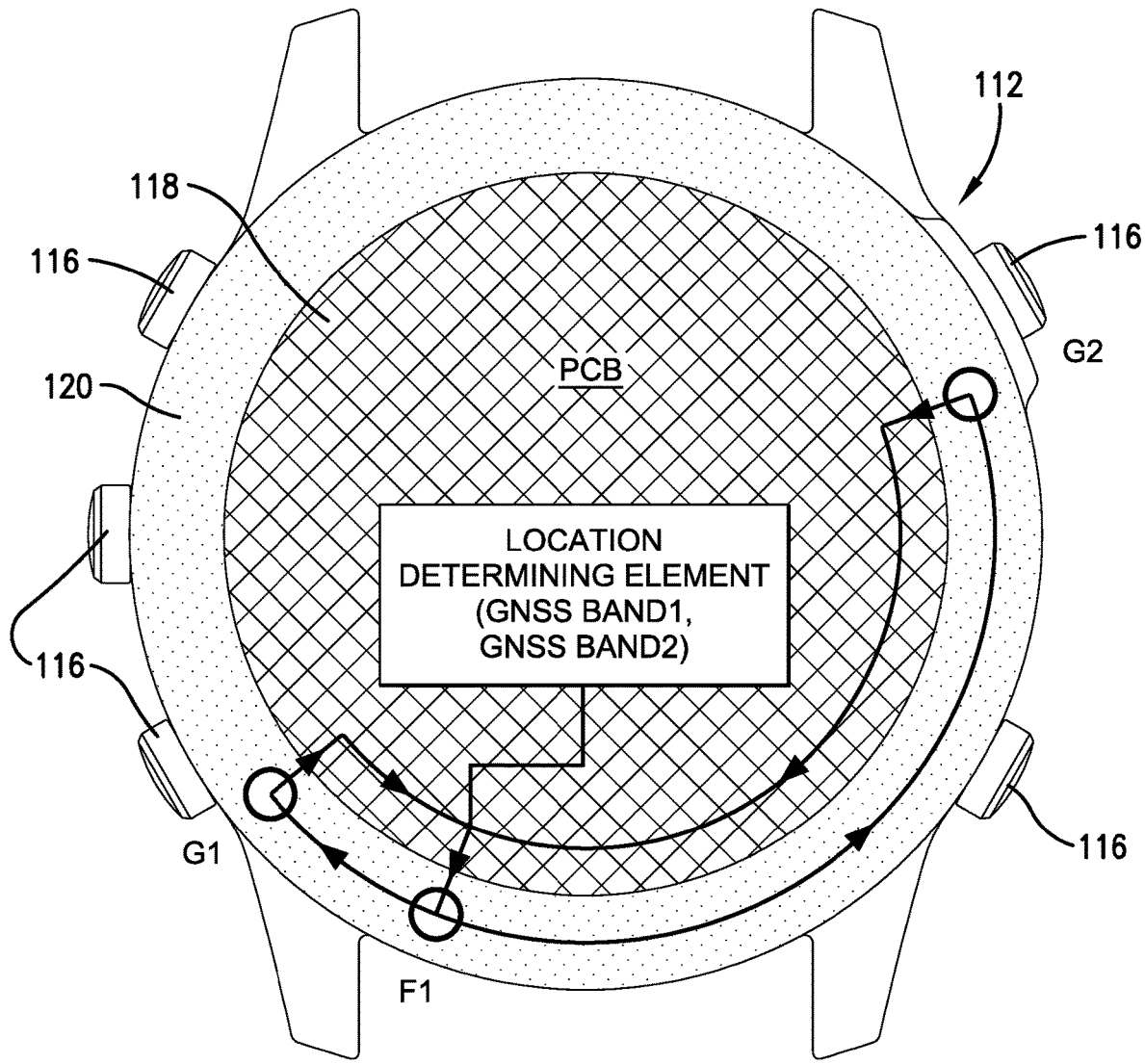
Figure 11B:
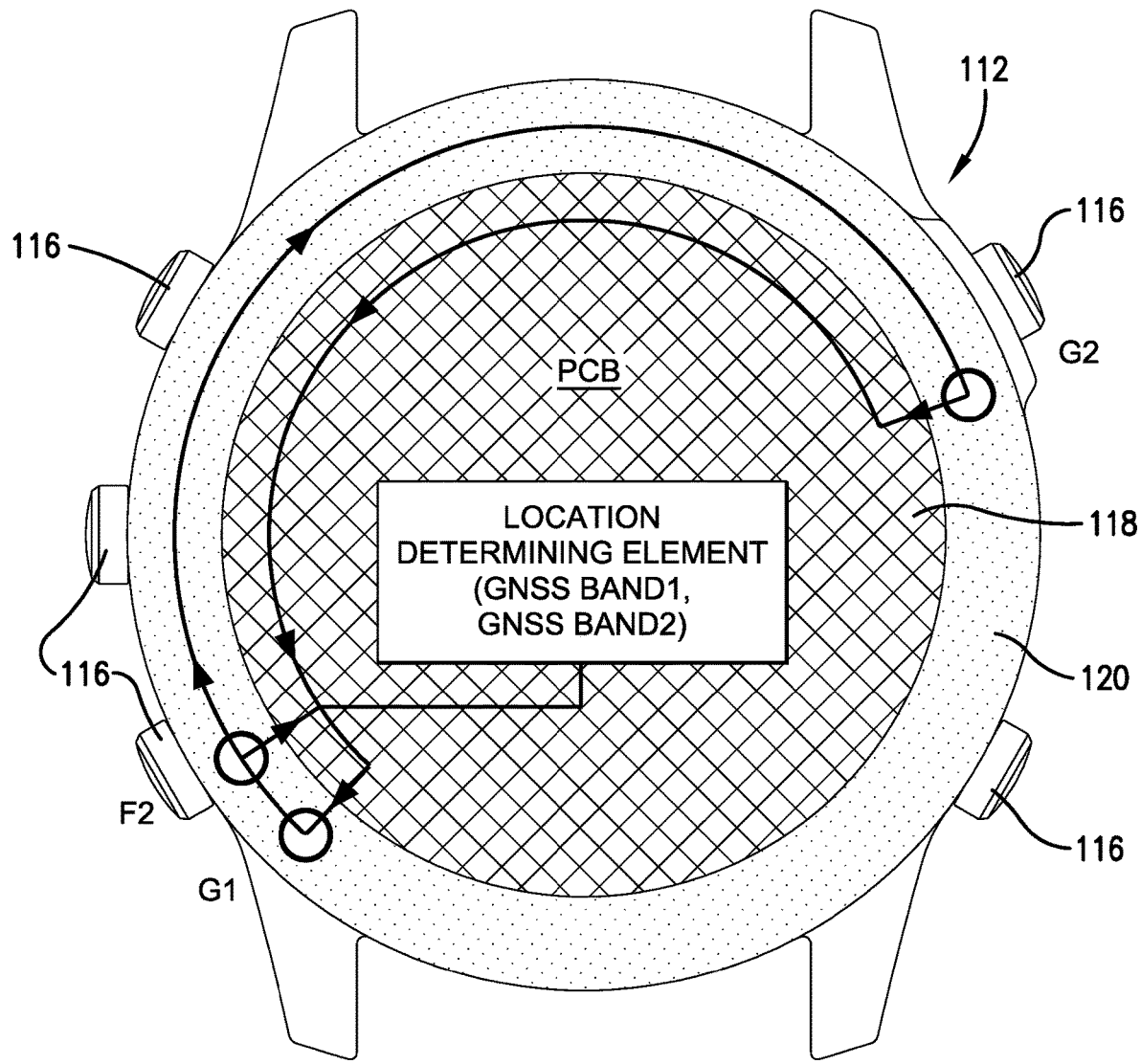
Figure 11C:
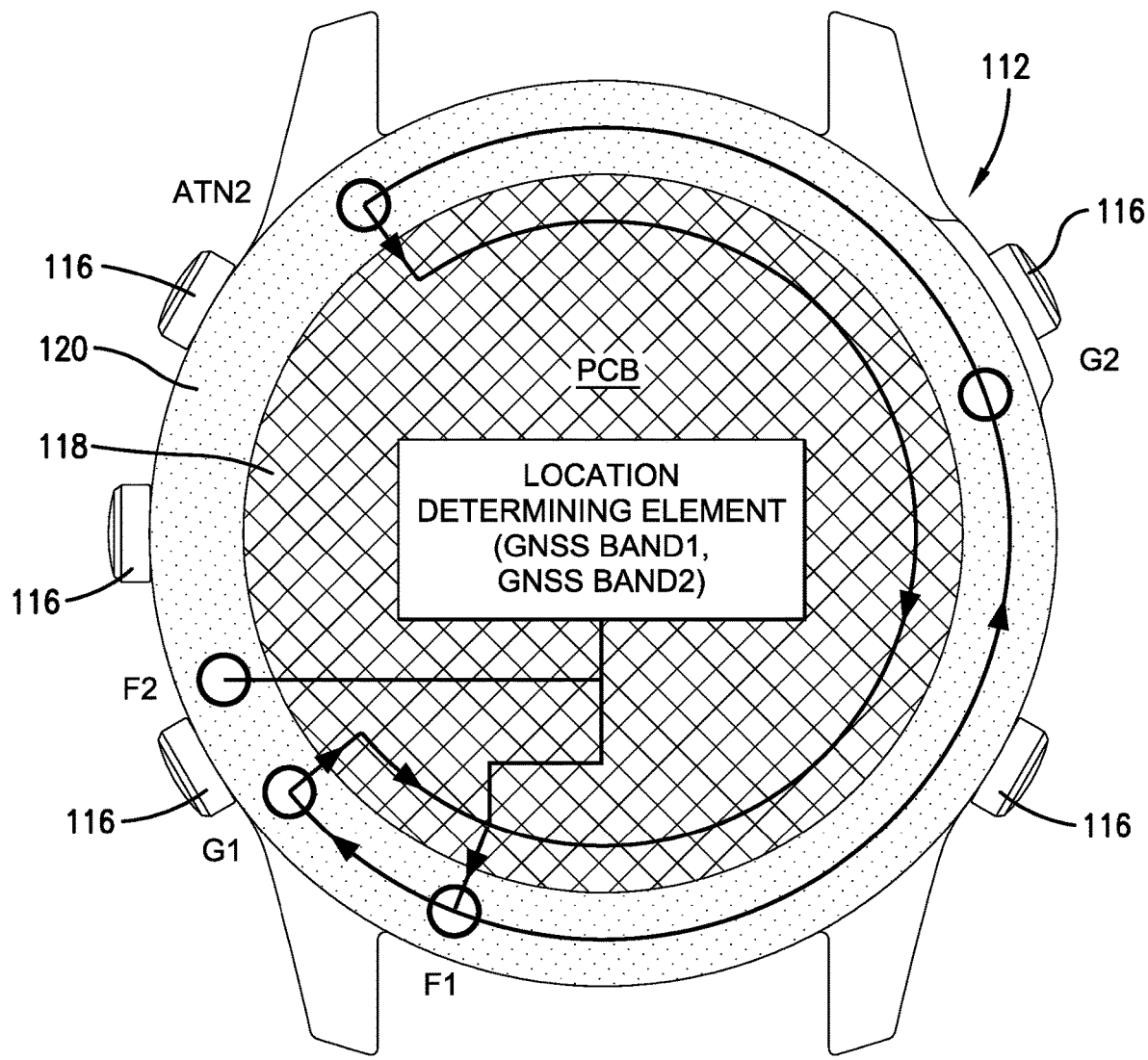

FIG. 11B is a top view of the second embodiment of the wrist-worn electronic device with the display removed to expose the printed circuit board within the housing, wherein FIG. 11B depicts a path for a second frequency band electronic signal; and FIG. 11C is a top view of the second embodiment of the wrist-worn electronic device with the display removed to expose a printed circuit board within the housing, wherein FIG. 11C depicts a path for the first frequency band electronic signal in a different mode from the mode of electronic device of FIG. 11A.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized, and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Relational terms, such as "above", "below", "over", "beneath", "upper", "upward", "lower", "downward", "top", "bottom", "outer", "inner", etc., may be used throughout this description. These terms are used with reference to embodiments of the technology and the orientations and relative positionings of the components thereof shown in the accompanying figures. Embodiments of the technology may be oriented and/or positioned in ways other than those shown in the figures. Therefore, the terms do not limit the scope of the present technology.

Embodiments of the present technology relate to an electronic device that can be worn on a user's wrist and includes a multi frequency band antenna configuration that utilizes a bezel on a housing to form a plurality of antennas that allow the electronic device to communicate wirelessly with other devices, systems, and networks. The electronic device may be embodied by a fitness watch, a wrist-worn smart phone, a wrist-worn navigation device, or other wearable multi-function electronic devices that include a housing and a wrist band, strap, or other attachment mechanism. Although the electronic device is typically worn on a wrist, it may also be worn, or adapted to wear, on other parts of a user's body such as the forearm or the upper arm. The electronic device may be used to monitor the user's current location, distance traveled, velocity, and other performance metrics by receiving location signals from a satellite-based positioning system including the global navigation satellite system (GNSS). The electronic device may be electronically paired with other devices such as a heart rate monitor worn around the user's chest, a foot pod attached to the user's shoe for measuring jogging or running cadence and distance, a bike speed and cadence sensor attached to a crank arm and wheel hub of the user's bicycle for tracking biking performance, and so forth. Furthermore, the electronic device may be able to communicate with smartphones, tablets, laptop or desktop computers, Wi-Fi routers, cell towers, and the like to allow the user to upload activity data, download apps, download or stream music, receive text messages, emails, and weather alerts, and so on. Thus, the electronic device may utilize or process signals with GNSS protocols, Bluetooth™, Wi-Fi, or cellular protocols, and so forth.

Figure 1A:
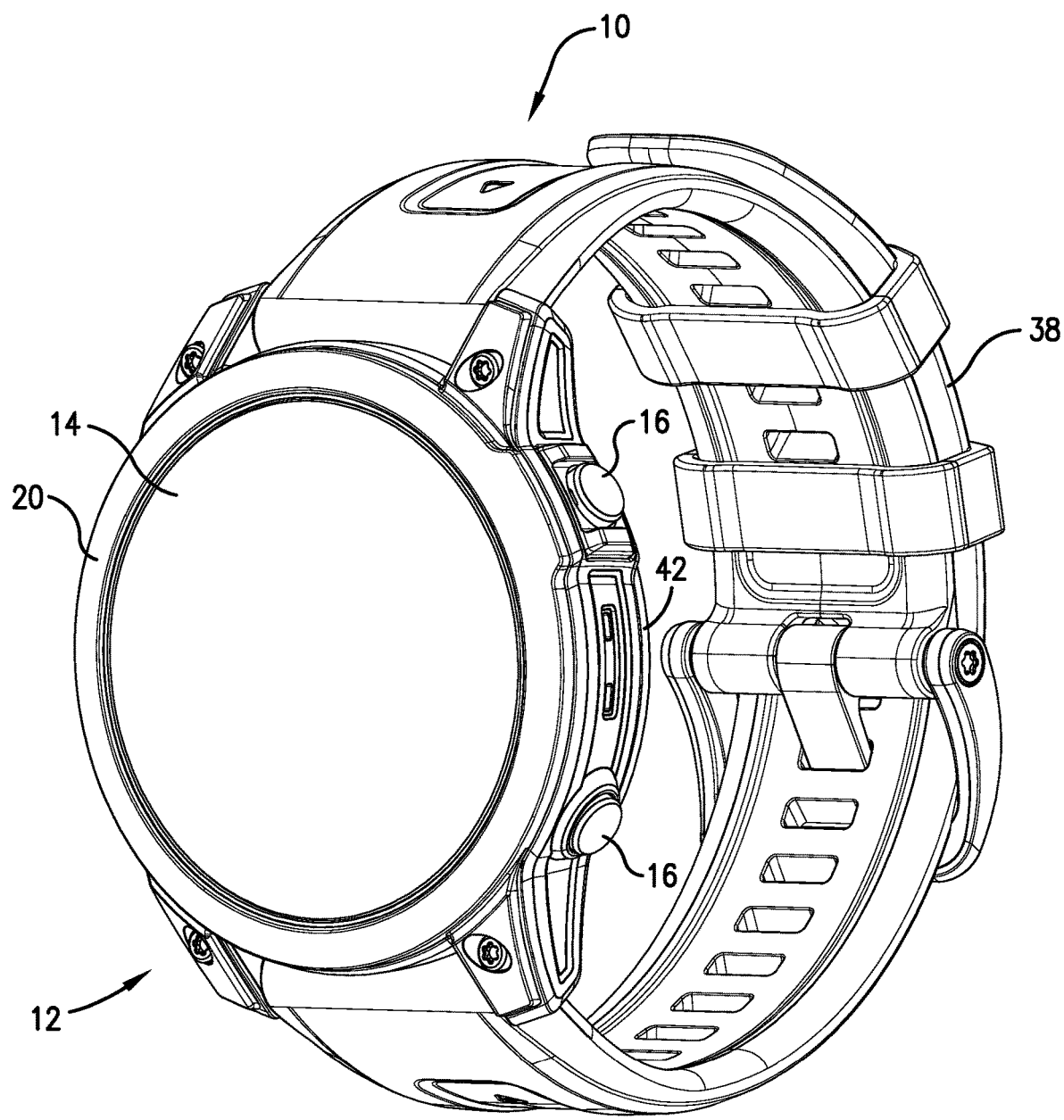
FIG. 1A is a front perspective view of a wrist-worn electronic device, constructed in accordance with embodiments of the present technology, featuring a housing with a display and a surrounding bezel which incorporates a multiple mode, multiple antenna aperture configuration.
Figure 1B:
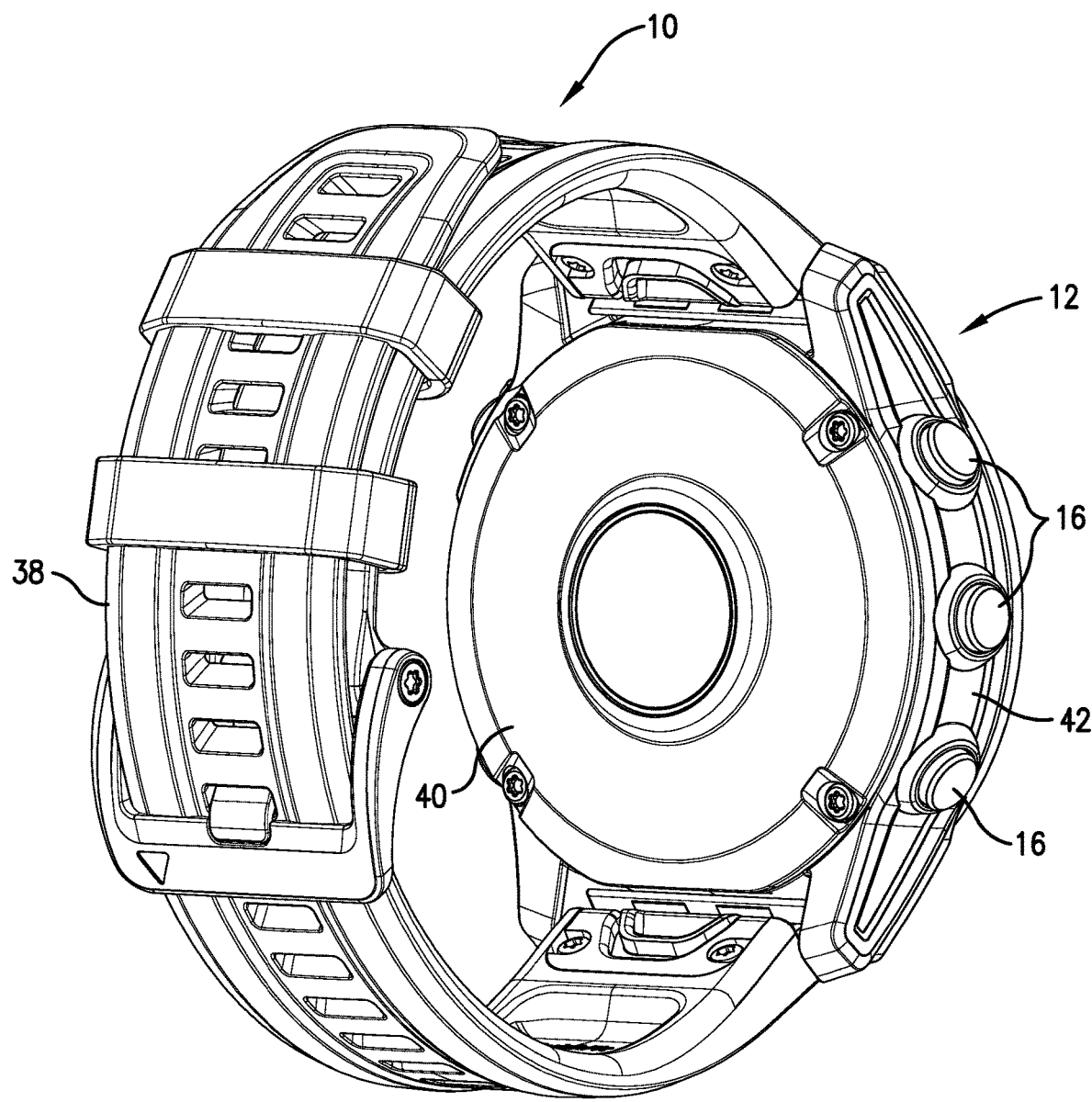
FIG. 1B is a rear perspective view of the wrist-worn electronic device.
Figure 2:
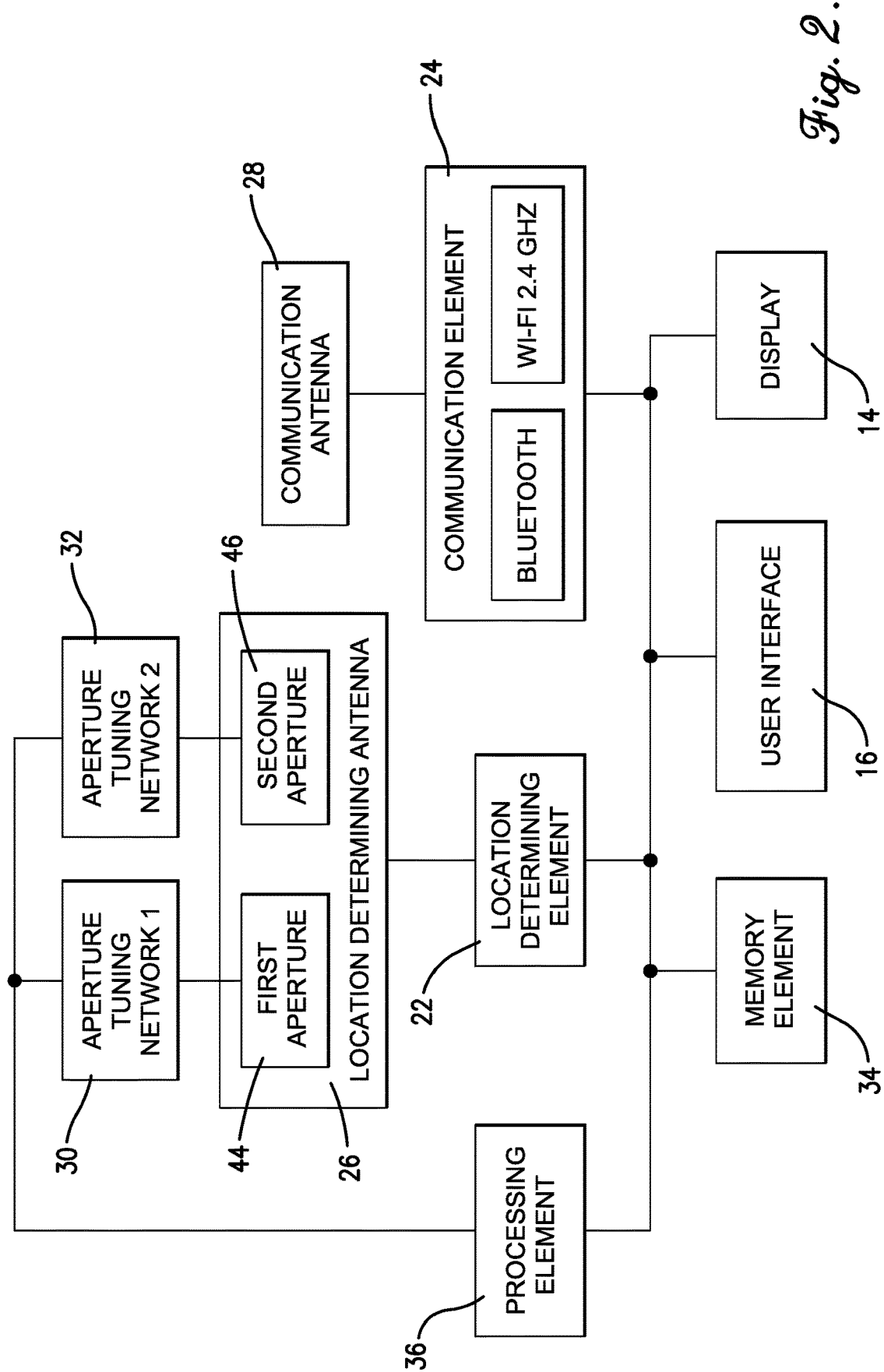
FIG. 2 is a schematic block diagram of one embodiment of various electronic components of the wrist-worn electronic device.

Embodiments of the technology will now be described in more detail with reference to the drawing figures. Referring initially to FIGS. 1A, 1B, and 2, a wrist-worn electronic device 10 is illustrated. The electronic device 10 broadly comprises a housing 12, a display 14, a user interface 16, a printed circuit board 18, a bezel 20, a location determining element 22, a communication element 24, a location determining antenna 26, a communication antenna 28, a first aperture tuning network 30, a second aperture tuning network 32, a memory element 34, and a processing element 36. The electronic device 10 may also include a wrist band 38, a strap, or other attachment mechanisms.

The electronic device 10 may operate in either a dual band mode or a single band mode with regard to determining the current geolocation of the electronic device 10. In the dual band mode, the electronic device 10 receives and processes a first location wireless signal having a frequency within a first frequency band and a second location wireless signal having a frequency within a second frequency band. In the single band mode, the electronic device 10 receives and processes the first location wireless signal only.

The housing 12, as shown in FIGS. 1A and 1B, generally houses or retains other components of the electronic device 10 and may include or be coupled to the wrist band 38. The housing 12 may include a bottom wall 40, at least one side wall 42, and an internal cavity. The bottom wall 40 includes a lower, outer surface that contacts the user's wrist while the user is wearing the electronic device 10. The side wall 42 couples to the bottom wall 40 at a lower edge of the side wall 42. In exemplary embodiments that are shown in the figures, the housing 12 includes a single side wall 42, with inner and outer surfaces, that has a circular or ring shape which generally forms a hollow cylinder. In other embodiments, the side wall 42 may have an oval or elliptical shape. In still other embodiments, the housing 12 may include a plurality of side walls which form one of a plurality of geometric or polygonal shapes, such as triangular, square or rectangular, hexagonal, octagonal, and so forth. In various embodiments, the side wall 42 may include a plurality of through holes, each of which passes from the outer surface to the inner surface.

The display 14, as shown in FIG. 1A, generally presents the information mentioned above, such as time of day, current location, and the like. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In exemplary embodiments that are shown in the figures, the display 14 has a round or circular shape. In general, the display 14 may possess a shape that corresponds to the shape formed by the side wall 42 of the housing 12. The outer edges or perimeter of the display 14 may couple to the side wall 42. In some embodiments, the display 14 may further include a lens overlying the viewing area, which may enhance the visibility of the information shown on the display 14. In various embodiments, the display 14 may also include a touch screen occupying the entire screen or a portion thereof so that the display 14 functions as part of the user interface 16. The touch screen may allow the user to interact with the electronic device 10 by physically touching, swiping, or gesturing on areas of the screen. The display 14 may be in communication electronic with the memory element 34 and the processing element 36 and may receive data or information therefrom that is to be shown on the display 14. The display 14 is coupled to the bezel 20, the side wall 42 of the housing 12, or both.

The user interface 16 generally allows the user to directly interact with the electronic device 10 and may include pushbuttons, rotating knobs, or the like. In exemplary embodiments of FIGS. 1A and 1B, the housing 12 may include one or more pushbuttons located in the through holes of the side wall 42 that function as at least a portion of the user interface 16. In various embodiments, the display 14 may include a touch screen occupying the entire display 14, or a portion thereof, so that the display 14 functions as at least a portion of the user interface 16. The touch screen may allow the user to interact with the electronic device 10 by physically touching, swiping, or gesturing on areas of the display 14.

The printed circuit board 18, shown as "PCB" in FIGS. 4, 6A, 6B, and 6C, generally retains and provides a substrate for supplying electric power to, and communication electronic between, the electronic components, such as the memory element 34, the processing element 36, the location determining element 22, the communication element 24, and the aperture tuning networks 30, 32, among others. The printed circuit board 18 may be constructed with a first, or top, surface and an opposing second, or bottom, surface. The printed circuit board 18 may also include multiple electrically conductive layers with a top conductive layer placed on the first surface, a bottom conductive layer placed on the second surface, one or more inner conductive layers positioned between the first and second surfaces, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. The conductive layers may be formed from metals typically including copper, but also including nickel, aluminum, gold, silver, palladium, zinc, tin, lead, and the like. Each conductive layer may include one or more electrically conductive traces. The conductive traces may be utilized to communicate electronic signals or may be electrically connected to electric power or ground. Each conductive layer may additionally or alternatively include one or more signal, power, or ground pads or terminals, full or partial electric power planes, or full or partial electric ground planes. In addition, the printed circuit board 18 may include plated through hole vias, blind vias, buried vias, and the like. The electronic components may be implemented in packages which are mounted, or retained, on the top surface, the bottom surface, or both surfaces. The electronic components may communicate with one another through electronic signal traces.

The electronic device 10 may further include a plurality of electrically conductive elements (not shown in the figures) that provide electrical connections between the printed circuit board 18 and the bezel 20. The electrically conductive elements may provide electrical connection for electronic signals and electronic ground. Each electrically conductive element may be formed from electrically conductive material, such as various metals or metal alloys. The electrically conductive elements may be embodied by pogo pins, wires, jumpers, posts, flexible conductors, conductive ribbons, clamp and/or spring structures, or the like, or combinations thereof. Each electrically conductive element may electrically connect to the printed circuit board 18 on the top or bottom surface, with a via through the printed circuit board 18, at the edge of the printed circuit board 18, or combinations thereof.

The bezel 20, as seen in FIGS. 1, 3A, 3B, 3C, 4, 6A, 6B, and 6C, may be positioned along an upper edge of the side wall 42 of the housing 12 and may generally cover the perimeter edges of the display 14 or encircle the display 14. The bezel 20 may be shaped to conform to the shapes of a circular or oval housing 12 and display 14 such that the bezel 20 may be positioned between the perimeters of the housing 12 and the display 14. The bezel 20 may have an inner edge with dimensions that are smaller than or approximately equal to the perimeter dimensions of the display 14 and an outer edge with dimensions that are approximately equal to the perimeter dimensions of the upper surface of the housing 12. Thus, the bezel 20 may be circular, square, or rectangular with a central opening through which the display 14 may be viewed, although in the exemplary embodiments shown in the figures, the bezel 20 may have an annular shape.

The bezel 20 may be formed from any material that may integrate an electrically conductive metallic or semi-metallic material and may be positioned on or fixedly attached to an outer surface of the side wall of a metallic or semi-metallic housing 12. In some embodiments, the bezel 20 may be able to rotate in place, roughly around the center of the upper surface of the housing 12. In other embodiments, the bezel 20 may be firmly attached to the upper surface and may not rotate. In certain embodiments, the bezel 20 may be integral to the housing 12. For example, the bezel 20 may be a raised or flush portion of the housing 12.

The location determining element 22 generally determines a current geolocation of the electronic device 10 and may receive and process radio frequency (RF) wireless signals, such as location wireless signals, from a multi-constellation global navigation satellite system (GNSS) such as the global positioning system (GPS) utilized in the United States, the GLONASS system utilized in Russia, the Galileo system utilized in Europe, or the like. The location determining element 22 may include satellite navigation receivers, processors, controllers, other computing devices, or combinations thereof, and memory.

When the electronic device 10 is operating in the dual band mode, the location determining element 22 receives and processes a first location electronic signal and a second location electronic signal from the location determining antenna 26. When the electronic device 10 is operating in the single band mode, the location determining element 22 receives and processes the first location electronic signal only from the location determining antenna 26. The first location electronic signal includes data and information from the first frequency band, i.e., the GPS L1 band, which has a center frequency of approximately 1575 MHz. The second location electronic signal includes data and information from the second frequency band, i.e., the GPS L5 band, which has a center frequency of approximately 1175 MHz. The location determining element 22 traditionally used the data and information from the GPS L1 band included in the first location electronic signal to determine the current geolocation (including coordinates, such as the latitude and longitude) of the electronic device 10. With the data and information from both the GPS L1 band and the GPS L5 band, the location determining element 22 of the current technology determines the current geolocation of the electronic device 10 with greater accuracy than by utilizing the GPS L1 band data and information alone.

The location determining element 22 communicates the current geolocation to the processing element 36, the memory element 34, or both. Although the location determining element 22 of the current technology utilizes data and information from GPS bands, it is within the scope of the current technology for the location determining element 22 to utilize data and information from two or more bands from other GNSS constellations, such as GLONASS or Galileo.

The location determining element 22 may also output a signal strength electronic signal whose electrical characteristic, such as electric voltage level or electric current level, or digital data value varies according to a signal strength of the first location electronic signal and/or the second location electronic signal.

The communication element 24 generally allows the electronic device 10 to communicate with other electronic devices, external systems, networks, and the like. The communication element 24 each may include signal and/or data transmitting and receiving circuits, such as amplifiers, filters, mixers, oscillators, digital signal processors (DSPs), and the like that process radio frequency (RF) electronic signals which include data transmitted and received using various communication standards. The communication element 24 processes a communication electronic signal by decoding data that has been received and encoding data to be transmitted. The communication electronic signal is communicated, or electronically coupled, between the communication element 24 and the communication antenna 28.

The communication electronic signal may have a frequency component ranging from approximately 2.40 gigahertz (GHz) to approximately 2.4835 GHz and includes data associated with communication standards such as ANT, ANT+, Bluetooth™, Bluetooth™ low energy (BLE), the industrial, scientific, and medical (ISM) band at 2.4 GHz, or the like. In addition, or instead, the communication electronic signal may include data that is associated with various Institute of Electrical and Electronics Engineers (IEEE) 802.11 Wi-Fi standards operating at 2.4 GHz.

In other embodiments, the communication element 24 may be configured to process electronic signals that include data associated with cellular or mobile communication standards such as 2G, 3G, 4G, Voice over Internet Protocol (VoIP), LTE, Voice over LTE (VoLTE), or 5G.

Each of the antennas 26, 28 converts wireless RF electromagnetic radiation (a wireless signal) at a particular frequency, i.e., a resonant frequency, into a corresponding electronic signal and converts an electronic signal into a corresponding wireless signal. Exemplary embodiments of the location determining antenna 26 are implemented as a half wavelength slot antenna. Exemplary embodiments of the communication antenna 28 are implemented as an inverted F antenna. Each of the antennas 26, 28 may be implemented as a different type of antenna, such as a loop antenna, a microstrip antenna, a patch antenna, a linear antenna, an inverted L-antenna, a monopole antenna, a dipole antenna, or the like. Furthermore, each of the antennas 26, 28 may be implemented to have an effective length, or radiating length, that is proportional to, corresponds to, or varies according to, a wavelength, or a portion thereof, such as a half wavelength or a quarter wavelength, of the wireless signal that is transmitted and/or received by the antenna 26, 28.

Figure 3A:
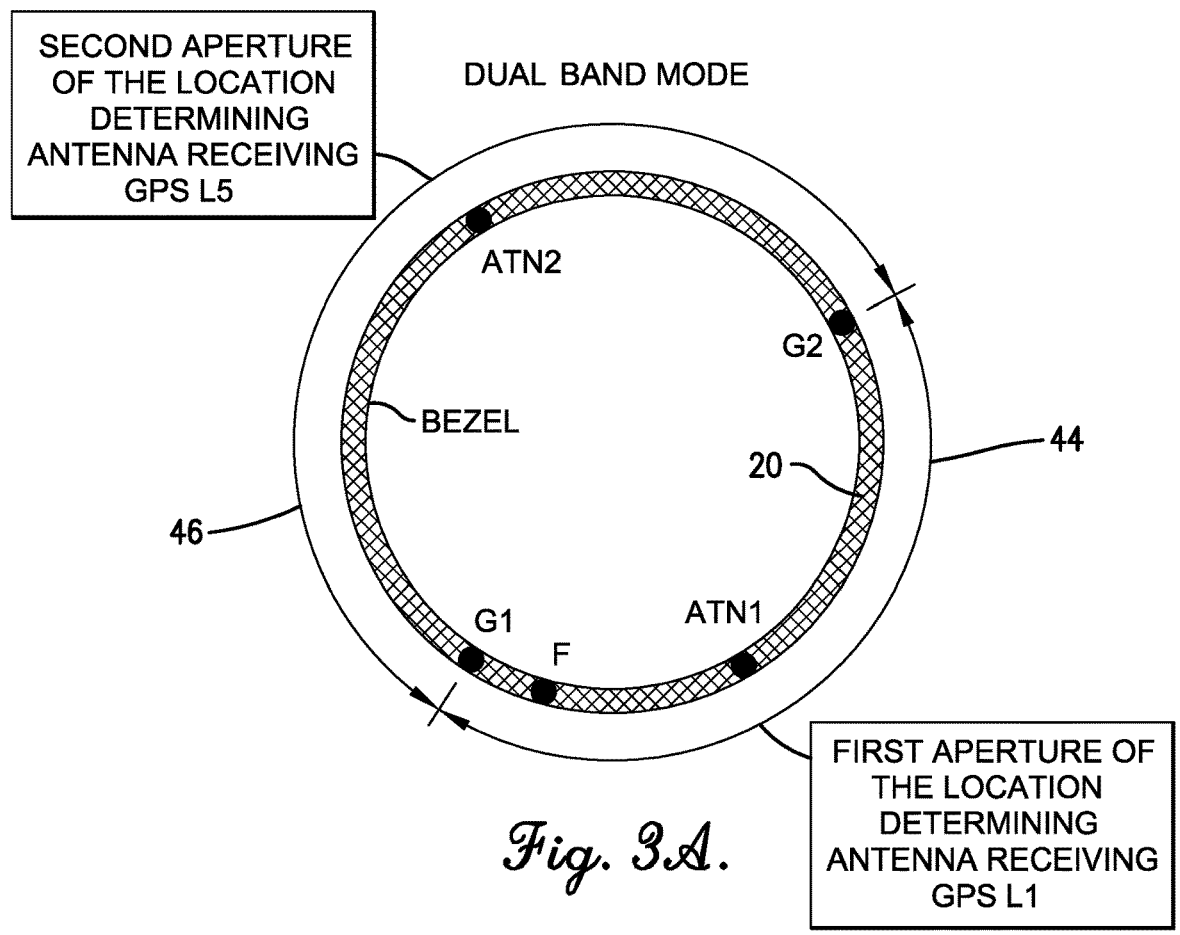
FIG. 3A is a top schematic view of the bezel including a first aperture and a second aperture of a location determining antenna while the wrist-worn electronic device is operating in a configuration of a dual band mode.

The location determining antenna 26 includes a first aperture 44 and a second aperture 46. The first aperture 44 is formed by the bezel 20 and has a physical length that occupies a first portion of a circumference of the bezel 20, as shown in FIG. 3A, wherein the first portion of the circumference of the bezel 20 may range from approximately the 2 o'clock position extending clockwise to approximately the 7 o'clock position. When the electronic device 10 is in either the dual band mode or the single band mode, the first aperture 44 is tuned (by the first aperture tuning network 30) to have an effective length that is proportional to, corresponds to, or varies according to, a half wavelength of the GPS L1 band, i.e., the first frequency band, which has a center frequency of approximately 1575 MHz. At this frequency, the effective length of the first aperture 44 is roughly equivalent to the physical length, so that the effective length occupies the first portion of a circumference of the bezel 20. The first aperture 44 includes a feed point (F) through which the first location electronic signal is communicated, a first electronic ground point (G1) which is positioned at a first end of the first portion of the circumference of the bezel 20, and a second electronic ground point (G2) which is positioned at a second end, opposite the first end, of the first portion of the circumference of the bezel 20. Furthermore, the first aperture 44 includes an aperture tuning network point (ATN1) for the electrical connection to a tuning electronic signal of the first aperture tuning network 30. The feed point F is electrically connected, through one electrically conductive element, to the location determining element 22 on the printed circuit board 18. The first electronic ground point G1 and the second electronic ground point G2 are electrically connected, each through one electrically conductive element, to electronic ground on the printed circuit board 18. The ATN1 point is electrically connected, through one electrically conductive element, to the tuning signal of the first aperture tuning network 30 on the printed circuit board 18.

The second aperture 46 is also formed by the bezel 20 and has a physical length that occupies a second portion of the circumference of the bezel 20, as shown in FIG. 3A, wherein the second portion covers the remainder of the circumference of the bezel 20 and may range from approximately the 2 o'clock position extending counterclockwise to approximately the 7 o'clock position. When the electronic device 10 is in the dual band mode, the second aperture 46 is tuned (by the second aperture tuning network 32) to have an effective length that is proportional to, corresponds to, or varies according to, a half wavelength of the GPS L5 band, i.e., the second frequency band, which has a center frequency of approximately 1175 MHz. At this frequency, the effective length of the second aperture 46 is roughly equivalent to the physical length, so that the effective length occupies the second portion of a circumference of the bezel 20. The second aperture 46 includes the feed point (F) through which the second location electronic signal is communicated, the first electronic ground point (G1) which is positioned at a first end of the second portion of the circumference of the bezel 20, and the second electronic ground point (G2) which is positioned at a second end, opposite the first end, of the second portion of the circumference of the bezel 20. Furthermore, the second aperture 46 includes an aperture tuning network point (ATN2) for the electrical connection to a tuning electronic signal of the second aperture tuning network 32. The feed point F, the first electronic ground point G1, and the second electronic ground point G2 are electrically connected to the printed circuit board 18, as described above. The ATN2 point is electrically connected, through one electrically conductive element, to the tuning signal of the second aperture tuning network 32 on the printed circuit board 18.

Figure 3B:
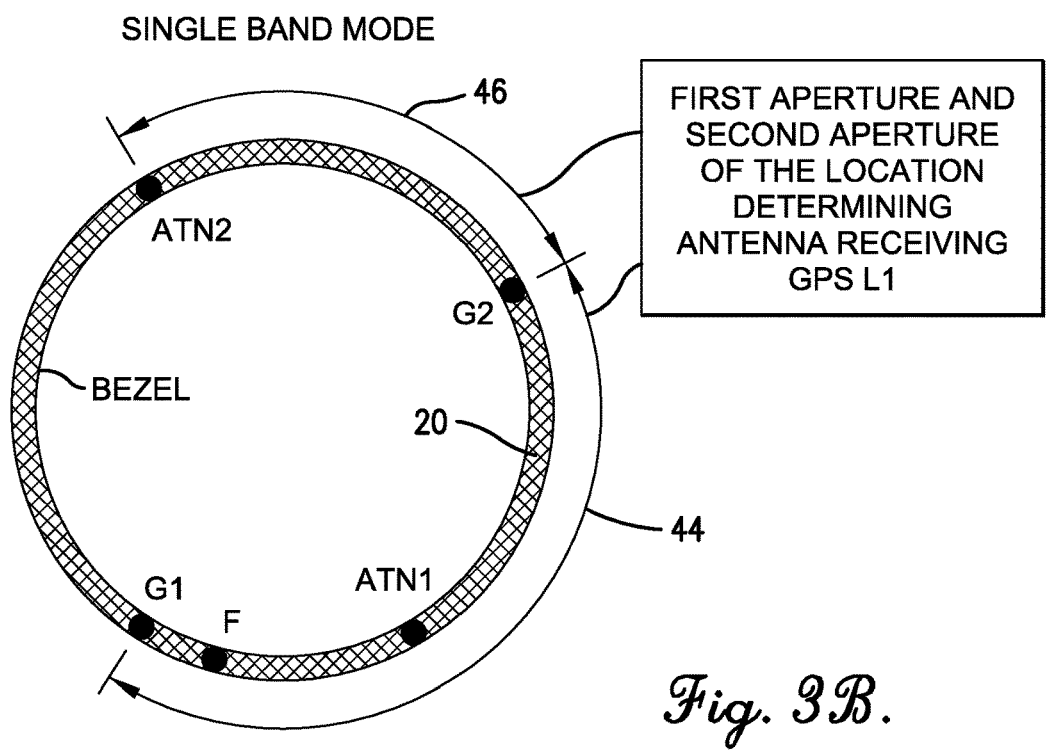
FIG. 3B is a top schematic view of the bezel including the first aperture and the second aperture while the wrist-worn electronic device is operating in one configuration of a single band mode.
Figure 3C:
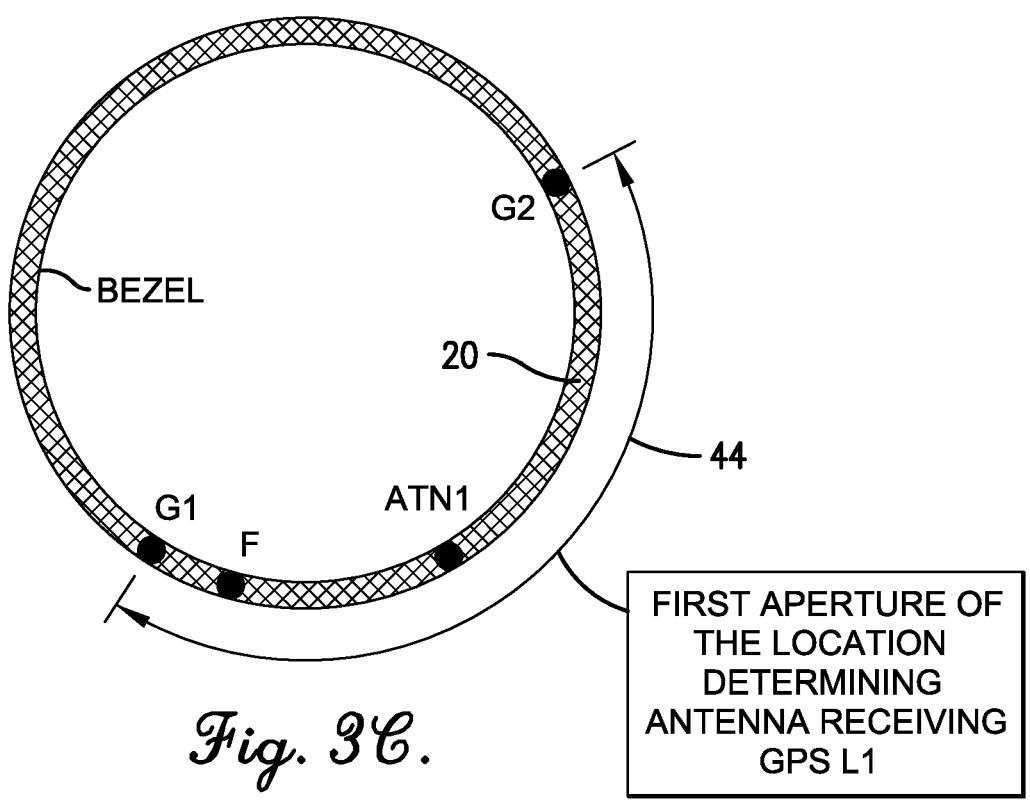
FIG. 3C is a top schematic view of the bezel including the first aperture and the second aperture while the wrist-worn electronic device is operating in another configuration of the single band mode.

When the electronic device 10 is in the single band mode, in some embodiments, the second aperture 46 is tuned (by the second aperture tuning network 32) to have an effective length that is proportional to, corresponds to, or varies according to, a half wavelength of the GPS L1 band. Thus, the effective length of the second aperture 46 is reduced so that it occupies a third portion of the circumference of the bezel 20, which is smaller than the second portion and lies within the second portion, as shown in FIG. 3B. In other embodiments, the second aperture 46 is not utilized. In these embodiments, the location determining antenna 26 comprises only the first aperture 44, as shown in FIG. 3C.

Figure 4:
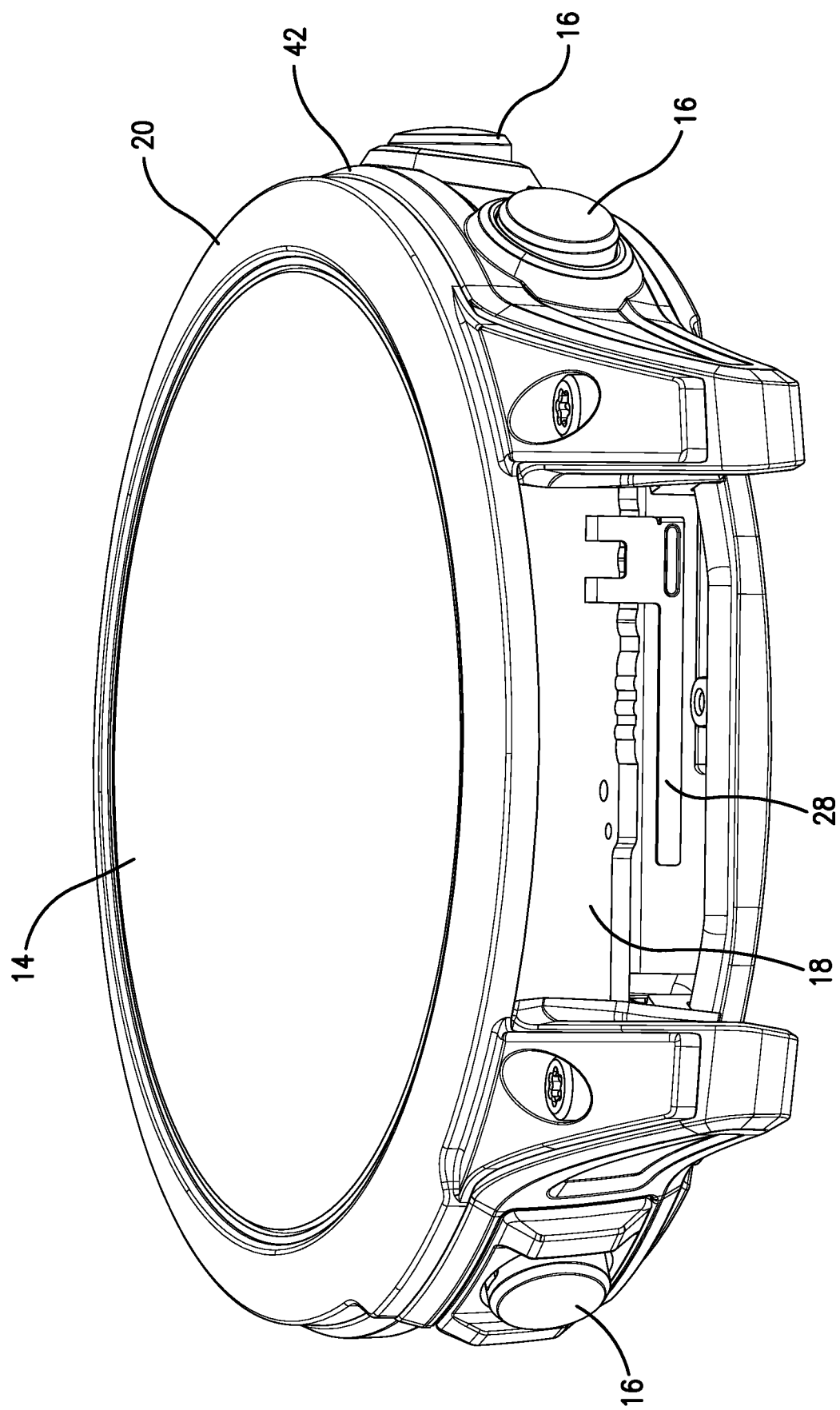
FIG. 4 is a side perspective view of the wrist-worn electronic device with a portion of a side wall of the housing removed to reveal a communication antenna configured to receive wireless communication signals.

The communication antenna 28 is configured to receive a communication wireless signal, such as ANT, ANT+, Bluetooth™, Bluetooth™ low energy (BLE), the ISM band, Wi-Fi, or the like, which has a frequency ranging from approximately 2.40 GHz to approximately 2.4835 GHz. The communication antenna 28 converts the communication wireless signal into the communication electronic signal, which is communicated, or electronically coupled, to the communication element 24. The communication antenna 28 is positioned within the internal cavity of the housing 12 adjacent to the side wall 42, as shown in FIG. 4, and is electrically connected to the printed circuit board 18 through two electrically conductive elements.

The first aperture tuning network 30 generally provides adjustment of a resonant frequency, i.e., tuning, of the first aperture 44 of the location determining antenna 26 and in turn, adjustment of the effective length of the first aperture 44. The first aperture tuning network 30 provides resonant frequency adjustment through the tuning electronic signal, which is electrically connected to the first aperture 44. The electrical connection is made on the bezel 20 at the point labeled "ATN1" in FIGS. 3A, 3B, and 3C. The first aperture tuning network 30 may include impedance, reactive, and/or resistive passive components as well as L networks, T networks, Pi networks, combinations thereof and so forth. Various embodiments of the first aperture tuning network 30 may include series-parallel combinations of a tunable capacitor, a capacitor, and/or an inductor. The components of the first aperture tuning network 30 may be formed from, or by, one or more conductive layers of the printed circuit board 18. The first aperture tuning network 30 may be implemented in either a first exemplary embodiment shown in FIG. 5A or a second exemplary embodiment shown in FIG. 5B.

The first embodiment has an adjustable configuration that includes a capacitor (C1), whose capacitance may be variable or adjustable, in parallel with a single-pole, single-throw (SPST) switch (S1) which functions, exists, or operates in either an open state or a closed state. The state of the switch S1 is controlled, set, or determined by a switch control electronic signal received from the processing element 36. When the switch S1 is in the open state, the tuning signal provides resonant frequency adjustment via the capacitor C1. When the switch S1 is in the closed state, the capacitor C1 is electrically shorted so that the tuning signal is pulled to electronic ground. Thus, by controlling, setting, or determining the state of the switch S1, the processing element 36 adjusts the configuration of the first aperture tuning network 30.

The second embodiment has an adjustable configuration that includes a fixed value or variable value capacitor (C1) in parallel with a plurality of inductor (L1-LN) and SPST switch (S1-SN) series combinations. Each S1-SN switch functions, exists, or operates in either an open state or a closed state, and the state of each switch S1-SN is individually controlled, set, or determined by one of a plurality of switch control electronic signals received from the processing element 36. The switches operating in the closed or opened state in various combinations adjusts the reactance and/or impedance of the first aperture tuning network 30, and in turn, adjusts the resonant frequency, via the capacitor C1 and the inductor L1-LN, of the connected aperture 44, 46. And, by controlling, setting, or determining the states of the switches S1-SN, the processing element 36 adjusts the configuration of the first aperture tuning network 30.

The second embodiment of the first aperture tuning network 30 generally provides fine resolution adjustment of the resonant frequency of the first aperture 44 of the location determining antenna 26. This feature allows for retuning of the first aperture 44 in case its resonant frequency drifts from what it should be. For example, if the first aperture 44 should be tuned to receive the GPS L1 band with a center frequency at approximately 1575 MHz and the resonant frequency has drifted above or below 1575 MHz, then one or more switches S1-SN of the second embodiment of the first aperture tuning network 30 may be opened or closed, as necessary, to adjust the resonant frequency of the first aperture 44 back to approximately 1575 MHz.

Figure 5A:
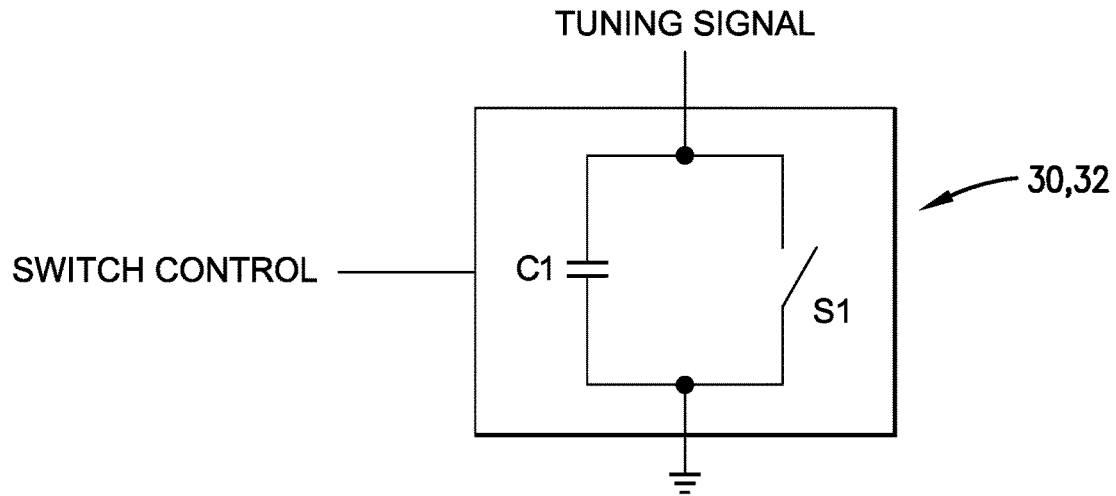
FIG. 5A is a schematic block diagram of one embodiment of an aperture tuning network.
Figure 5B:
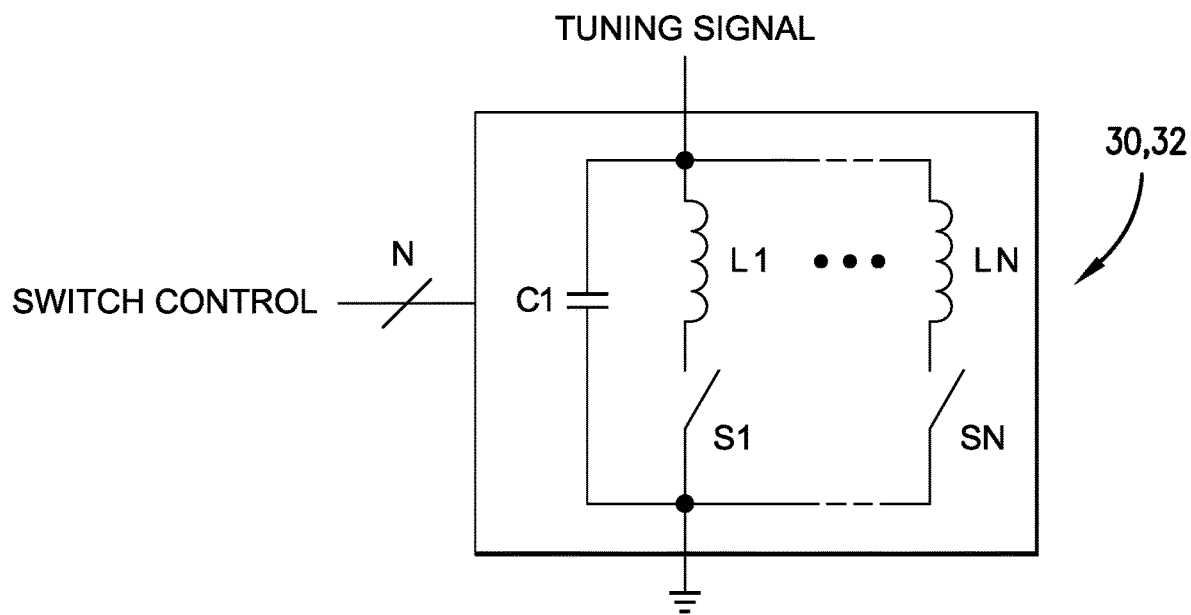
FIG. 5B is a schematic block diagram of another embodiment of the aperture tuning network.

The second aperture tuning network 32 is the same as, or very similar to, the first aperture tuning network 30 in structure and function and provides adjustment of a resonant frequency, i.e., tuning, of the second aperture 46 of the location determining antenna 26 and in turn, adjustment of the effective length of the second aperture 46. The second aperture tuning network 32 provides resonant frequency adjustment through the tuning electronic signal, which is electrically connected to the second aperture 46. The second aperture tuning network 32 may be implemented in either the first embodiment as shown in FIG. 5A or the second embodiment as shown in FIG. 5B. The electrical connection is made on the bezel 20 at the point labeled "ATN2" in FIGS. 3A and 3B.

In addition, the second aperture tuning network 32 receives one or more switch control electronic signals from the processing element 36 to adjust the configuration of the second aperture tuning network 32. And, adjustment of the configuration of the second aperture tuning network 32 also adjusts, sets, or changes the operating mode between dual band mode and single band mode. For example, with the first embodiment of the second aperture tuning network 32, as shown in FIG. 5A, when the first switch S1 is in the open state, the tuning electronic signal provides resonant frequency adjustment via the capacitor C1, which has a capacitance value that sets the resonant frequency of the second aperture 46 of the location determining antenna 26 to the frequency of the GPS L5 wireless signal—resulting in the electronic device 10 being in the dual band mode. When the first switch S1 is in the closed state, the tuning electronic signal is shorted to electronic ground which sets the resonant frequency of the second aperture 46 to the frequency of the GPS L1 wireless signal—resulting in the electronic device 10 being in the single band mode. Shorting the tuning electronic signal to electronic ground also reduces the effective length of the second aperture 46, which in turn results in the second aperture 46 resonating at the higher frequency of the GPS L1 band.

Continuing the example, with the second embodiment of the second aperture tuning network 32, as shown in FIG. 5B, variation of the number of switches S1-SN being in the closed state varies, or changes, the resonant frequency of the second aperture 46 between the GPS L1 band and the GPS L5 band. That is, one or more switches S1-SN being in the closed state adjusts the resonant frequency of the second aperture 46 to a frequency in the GPS L5 band (i.e., the dual band mode) and one or more switches S1-SN being in the closed state adjusts the resonant frequency of the second aperture 46 to a frequency in the GPS L1 band (i.e., the single band mode), or vice versa. Furthermore, selecting the number of closed switches S1-SN adjusts the reactance and/or impedance of the second aperture tuning network 32, which also adjusts the effective length of the second aperture 46.

In addition, the second embodiment of the second aperture tuning network 32 generally provides fine resolution adjustment of the resonant frequency of the second aperture 46 of the location determining antenna 26. This feature allows for retuning of the second aperture 46 in case its resonant frequency drifts from what it should be.

Figure 6A:
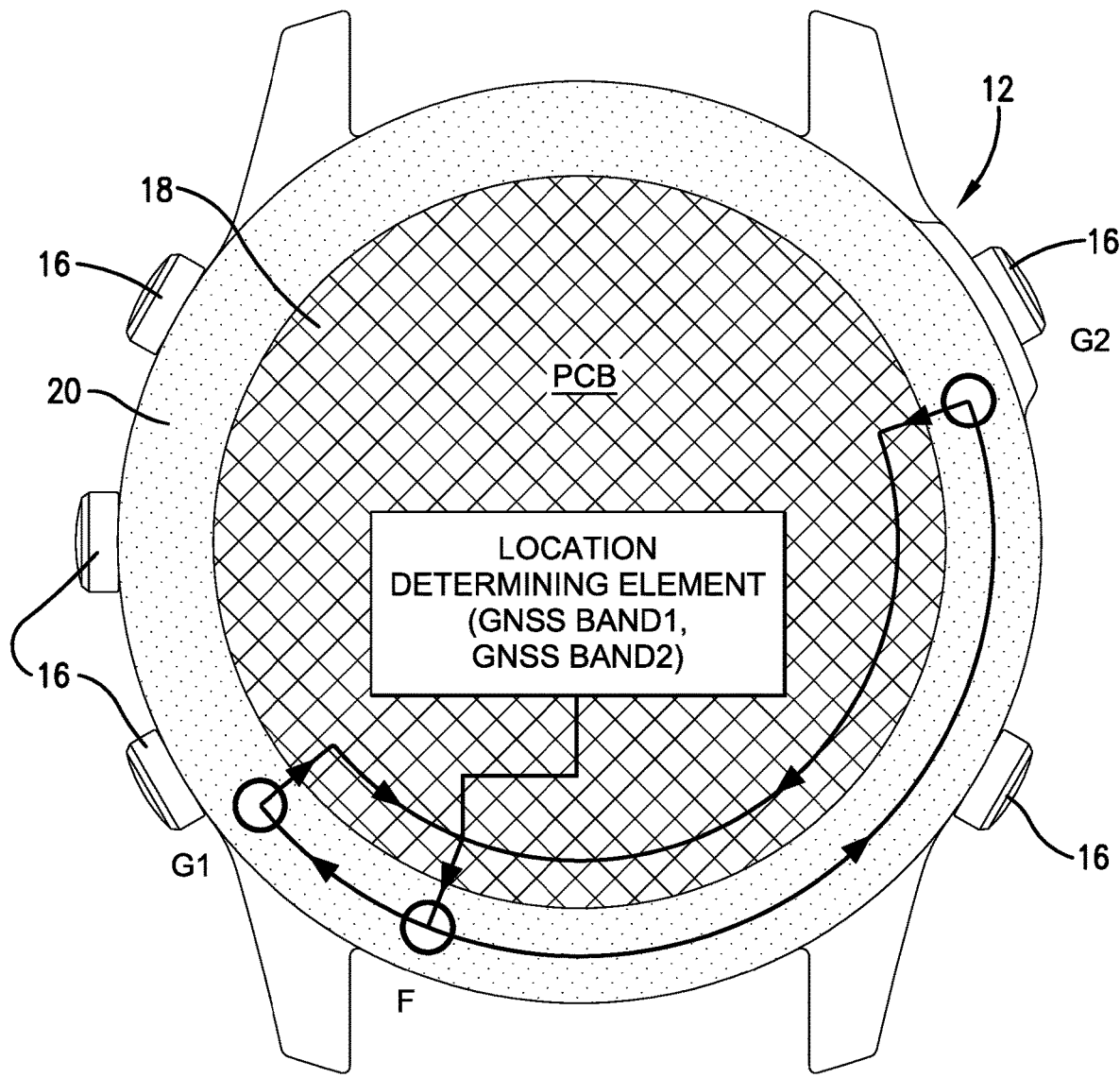

Referring to FIG. 6A, a signal path for the first location electronic signal, which is generated by the first aperture 44 of the location determining antenna 26 in the dual band mode or the single band mode, is shown. The signal path includes a first path along the first portion of the circumference of the bezel 20 and a second path through one or more electrically conductive layers, perhaps including ground planes, of the printed circuit board 18. In addition, the signal path includes one or more electrically conductive traces on the printed circuit board 18 that electrically connect to the location determining element 22. Furthermore, the signal path includes a plurality of electrically conductive elements that provide electrical connection between the bezel 20 and the printed circuit board 18. Specifically, the signal path may include a first electrically conductive element positioned in the vicinity of the feed point F on the bezel 20, a second electrically conductive element positioned in the vicinity of the first electronic ground point G1 on the bezel 20, and a third electrically conductive element positioned in the vicinity of the second electronic ground point G2 on the bezel 20.

Figure 6B:
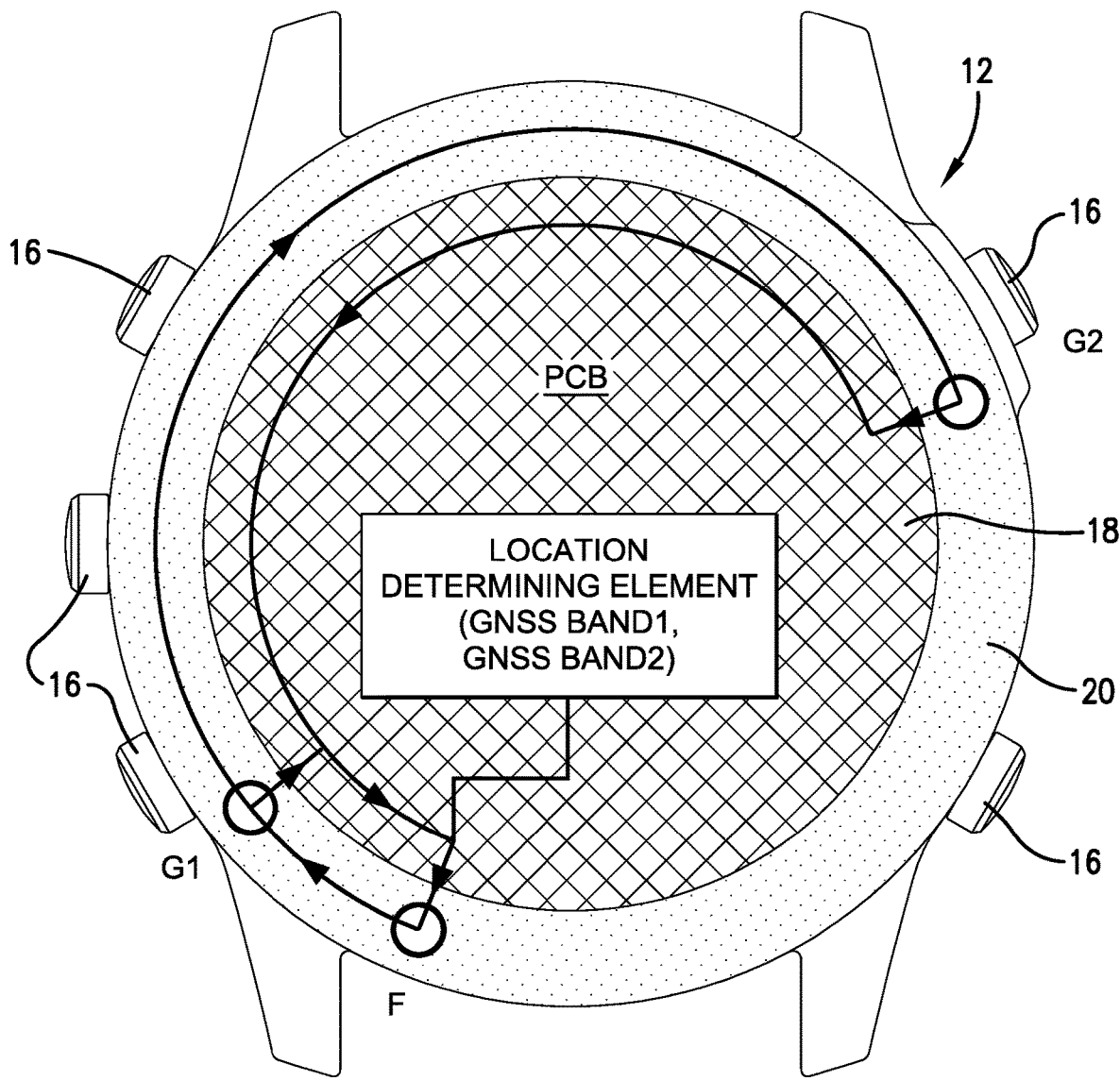

Referring to FIG. 6B, a signal path for the second location electronic signal, which is generated by the second aperture 46 of the location determining antenna 26 in the dual band mode, is shown. The signal path includes a first path along the second portion of the circumference of the bezel 20 and a second path through one or more electrically conductive layers, perhaps including ground planes, of the printed circuit board 18. In addition, the signal path includes one or more electrically conductive traces on the printed circuit board 18 that electrically connect to the location determining element 22. Furthermore, the signal path shares the first, second, and third electrically conductive elements, associated with the feed point F, the first electronic ground point G1, and the second electronic ground point G2, respectively, with the location determining antenna 26.

Figure 6C:
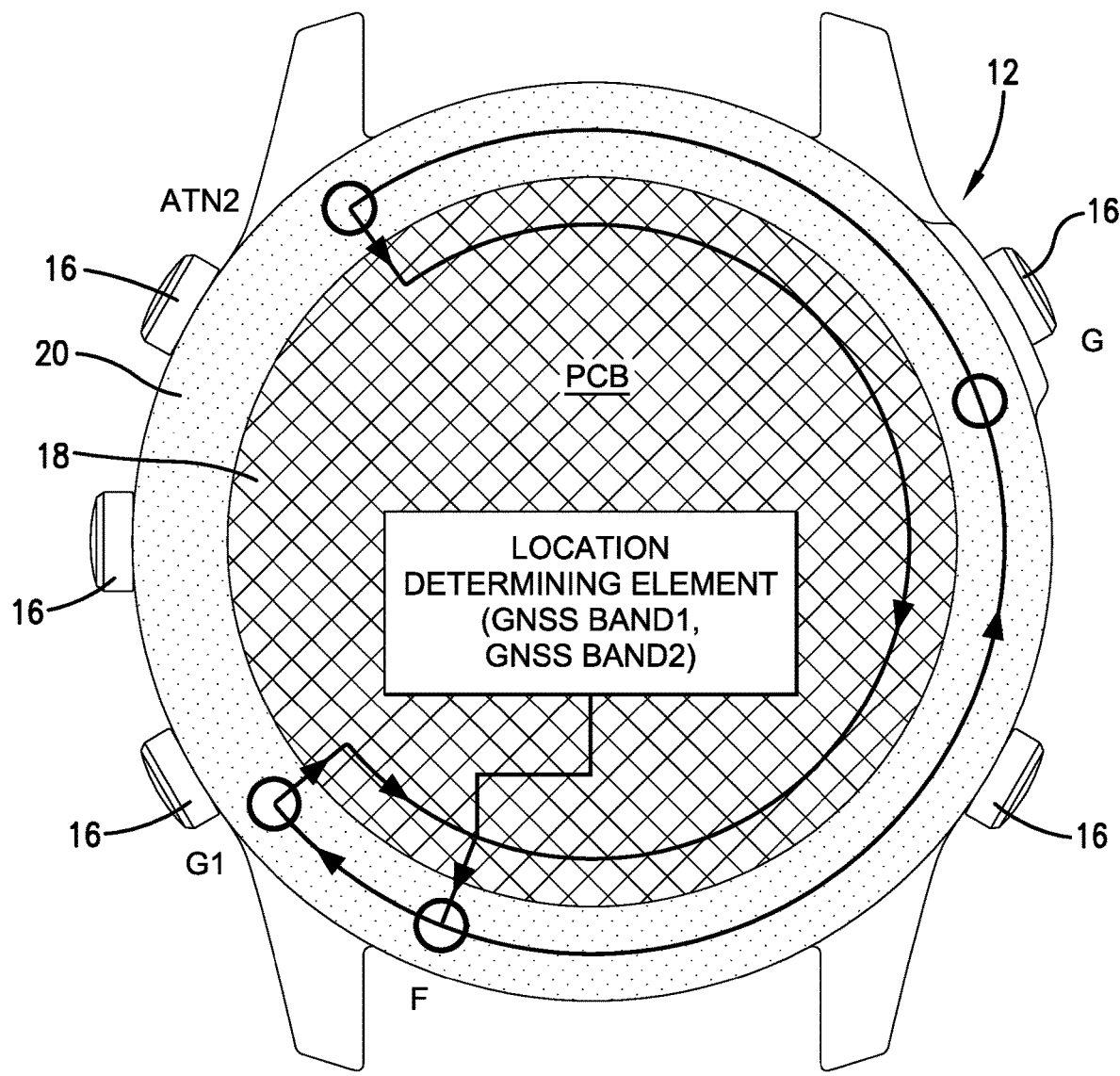

Referring to FIG. 6C, a signal path for the first location electronic signal, which is generated by the first aperture 44 and the second aperture 46 of the location determining antenna 26 in the single band mode, is shown. The signal path includes a first path along the first portion of the circumference of the bezel 20 and the third portion of the circumference of the bezel 20. The signal path includes a second path through one or more electrically conductive layers, perhaps including ground planes, of the printed circuit board 18. In addition, the signal path includes one or more electrically conductive traces on the printed circuit board 18 that electrically connect to the location determining element 22. Furthermore, the signal path includes a plurality of electrically conductive elements that provide electrical connection between the bezel 20 and the printed circuit board 18. Specifically, the signal path may include a first electrically conductive element positioned in the vicinity of the feed point F on the bezel 20, a second electrically conductive element positioned in the vicinity of the first electronic ground point G1 on the bezel 20, and a third electrically conductive element positioned in the vicinity of the ATN2 point on the bezel 20.

The memory element 34 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 34 may be embedded in, or packaged in the same package as, the processing element 36. The memory element 34 may include, or may constitute, a non-transitory "computer-readable medium". The memory element 34 may store the instructions, code, code statements, code segments, software, firmware, programs, applications, apps, services, daemons, or the like that are executed by the processing element 36. The memory element 34 may also store data that is received by the processing element 36 or the device in which the processing element 36 is implemented. The processing element 36 may further store data or intermediate results generated during processing, calculations, and/or computations as well as data or final results after processing, calculations, and/or computations. In addition, the memory element 34 may store settings, text data, documents from word processing software, spreadsheet software and other software applications, sampled audio sound files, photograph or other image data, movie data, databases, and the like.

The processing element 36 may comprise one or more processors. The processing element 36 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 36 may generally execute, process, or run instructions, code, code segments, code statements, software, firmware, programs, applications, apps, processes, services, daemons, or the like. The processing element 36 may also include hardware components such as registers, finite-state machines, sequential and combinational logic, configurable logic blocks, and other electronic circuits that can perform the functions necessary for the operation of the current invention. In certain embodiments, the processing element 36 may include multiple computational components and functional blocks that are packaged separately but function as a single unit. In some embodiments, the processing element 36 may further include multiprocessor architectures, parallel processor architectures, processor clusters, and the like, which provide high performance computing. The processing element 36 may be in communication electronic with the other electronic components of the electronic device 10 through serial or parallel links that include universal busses, address busses, data busses, control lines, and the like.

The processing element 36 may be operable, configured, or programmed to perform the following functions by utilizing hardware, software, firmware, or combinations thereof. The processing element 36 outputs the one or more switch control electronic signals which are received by the first aperture tuning network 30 and the second aperture tuning network 32. With the first embodiment of the aperture tuning network 30, 32 as shown in FIG. 5A, the processing element 36 outputs a first switch control electronic signal which is received by the first aperture tuning network 30 and a second switch control electronic signal which is received by the second aperture tuning network 32. With the second embodiment of the aperture tuning network 30, 32 as shown in FIG. 5B, the processing element 36 outputs a first plurality of switch control electronic signals which are received by the first aperture tuning network 30 and a second plurality of switch control electronic signals which are received by the second aperture tuning network 32. Typically, the processing element 36 outputs the same number (N) of switch control electronic signals for each aperture tuning network 30, 32 as there are inductor and switch series combinations in the aperture tuning network 30, 32. Each switch control electronic signal has a first electric voltage and/or electric current level or digital data value to place one switch of the aperture tuning network 30, 32 in the open state and a second electric voltage and/or electric current level or digital data value to place the switch in the closed state.

By setting the level or data value for the one or more switch control electronic signals for the second aperture tuning network 32, the processing element 36 sets or adjusts the configuration of the second aperture tuning network 32 which sets or adjusts the resonant frequency of the second aperture 46 of the location determining antenna 26 between the first frequency band and the second frequency band. In one configuration, the second aperture tuning network 32 sets or adjusts the resonant frequency of the second aperture 46 to the second frequency band, which is one of the conditions for the dual band mode. In another configuration, the second aperture tuning network 32 sets or adjusts the resonant frequency of the second aperture 46 to the first frequency band, which is one of the conditions for the single band antenna mode. Thus, by setting the level or data value for the one or more switch control electronic signals for the second aperture tuning network 32, the processing element 36 sets or adjusts the mode to either dual band mode or single band mode.

When the electronic device 10 includes the second embodiment of the first aperture tuning network 30 and the second aperture tuning network 32, the processing element 36 also receives the signal strength electronic signal from the location determining element 22 whose electric voltage or electric current level or digital data value varies according to a signal strength of the first location electronic signal and/or the second location electronic signal. In some embodiments, the processing element 36 may receive the first location electronic signal and the second location electronic signal itself and determine the signal strengths. If the signal strength from the first location electronic signal and/or the second location electronic signal drops below a signal strength threshold level, then the processing element 36 sets the level or data value for the one or more switch control electronic signals for the first aperture tuning network 30 and the second aperture tuning network 32, as necessary, to retune the first aperture 44 and/or the second aperture 46. For example, if the signal strength of the first location electronic signal drops below the signal strength threshold level, then it is possible that the first aperture 44 of the location determining antenna 26 needs to be retuned. The processing element 36 may then set the level or data value for the one or more switch control electronic signals for the first aperture tuning network 30 to open one or more switches S1-SN or close one or more switches S1-SN, possibly depending on the current state of the switches S1-SN, in order to change the resonant frequency of, i.e., retune, the first aperture 44 so that the signal strength of the first location electronic signal increases to an acceptable level. The processing element 36 may set the level or data value for the one or more switch control electronic signals to open or close the switches S1-SN one at a time, or in groups, in a particular order and check the level of the signal strength of the first location electronic signal after each change. The processing element 36 may stop changing the state of the switches S1-SN when the signal strength of the first location electronic signal increases to an acceptable level. Or, the processing element 36 may revert back to the original switch setting if no improvement can be made.

If the signal strength of the second location electronic signal drops below the signal strength threshold level, then it is possible that the second aperture 46 of the location determining antenna 26 needs to be retuned. The processing element 36 may then follow the same procedure as discussed above for changing the states S1-SN of the second aperture tuning network 32. Thus, the processing element 36 may set the level or data value for the one or more switch control electronic signals to open or close the switches S1-SN one at a time, or in groups, in a particular order and check the level of the signal strength of the second location electronic signal after each change. The processing element 36 may stop changing the state of the switches S1-SN when the signal strength of the second location electronic signal increases to an acceptable level.

The electronic device 10 may function and/or operate as follows. In the dual band antenna mode, the first aperture 44 of the location determining antenna 26 receives the GPS L1 band wireless signal and the second aperture 46 of the location determining antenna 26 receives the GPS L5 band wireless signal. The location determining element 22 receives and processes information from both the GPS L1 band electronic signal and the GPS L5 band electronic signal and is able to make a more accurate determination of the current geolocation of the electronic device 10. In the single band mode, in some embodiments, the first aperture 44 of the location determining antenna 26 and the second aperture 46 of the location determining antenna 26 each receive the GPS L1 band wireless signal. In other embodiments, the second aperture 46 is not utilized so that only the first aperture 44 receives the GPS L1 band wireless signal. With the location determining element 22 receiving and processing information from only one location electronic signal (the GPS L1 band electronic signal), the electronic device 10 operates in a lower power mode.

Since adjusting the configuration of the second aperture tuning network 32 (by setting the level or data value for the switch control electronic signals) also changes the mode between dual band and single band, the processing element 36 may set the level or data value for the switch control electronic signals based on, or according to, output from the location determining element 22. For example, when the electronic device 10 is indoors or the location determining antenna 26 is otherwise unable to receive the GNSS wireless signals, the location determining element 22 may output an indication that it is unable to determine the current geolocation. In such a situation, the processing element 36 may set the level or data value for the switch control electronic signals to set the location determining antenna 26 in the single band mode in order to conserve battery power. In other situations, the processing element 36 may set the level or data value for the switch control electronic signals based on, or according to, other signals and/or data received from sensors either integrated with, or external to, the electronic device 10 which are not discussed herein. For example, the processing element 36 may set the level or data value for the switch control electronic signals based on, or according to, input from an accelerometer or a heart rate monitor. Utilizing the input from an accelerometer or a heart rate monitor, the processing element 36 may determine that the user has removed the electronic device 10 from his wrist or other body part. The user may have placed the electronic device 10 on an object to remain stationary while he performs some other task, or the user may have mounted the electronic device 10 to a bicycle or a vehicle. The processing element 36 may set the level or data value for the switch control electronic signals to set the location determining antenna 26 in the mode appropriate for the situation. Additionally, or alternatively, the processing element 36 may set the level or data value for the switch control electronic signals based on, or according to, user preferences or settings for power consumption. The processing element 36 may be able to monitor battery charge level and may set the level or data value for the switch control electronic signals to set the location determining antenna 26 in the mode appropriate to save battery power.

Figure 7A:
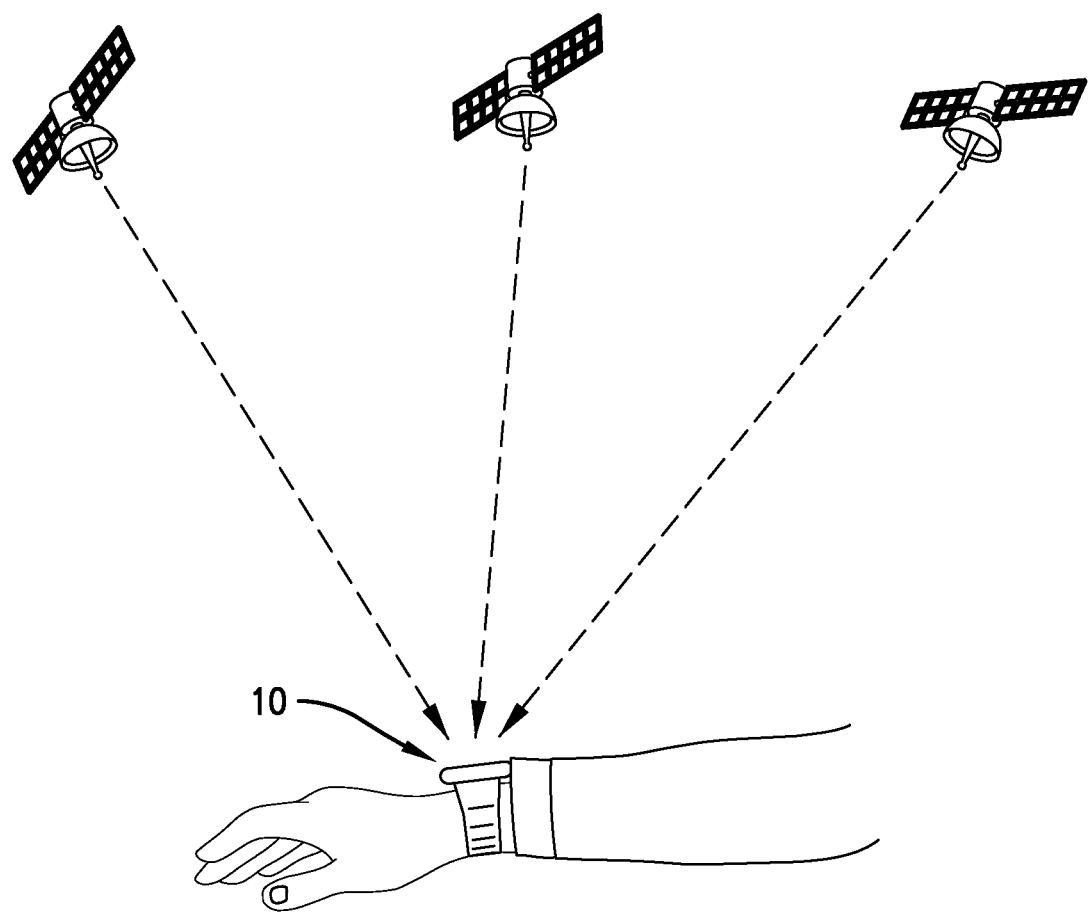
FIG. 7A is a side view of a user's arm wearing the electronic device while the device is receiving wireless signals from GNSS satellites.
Figure 7B:
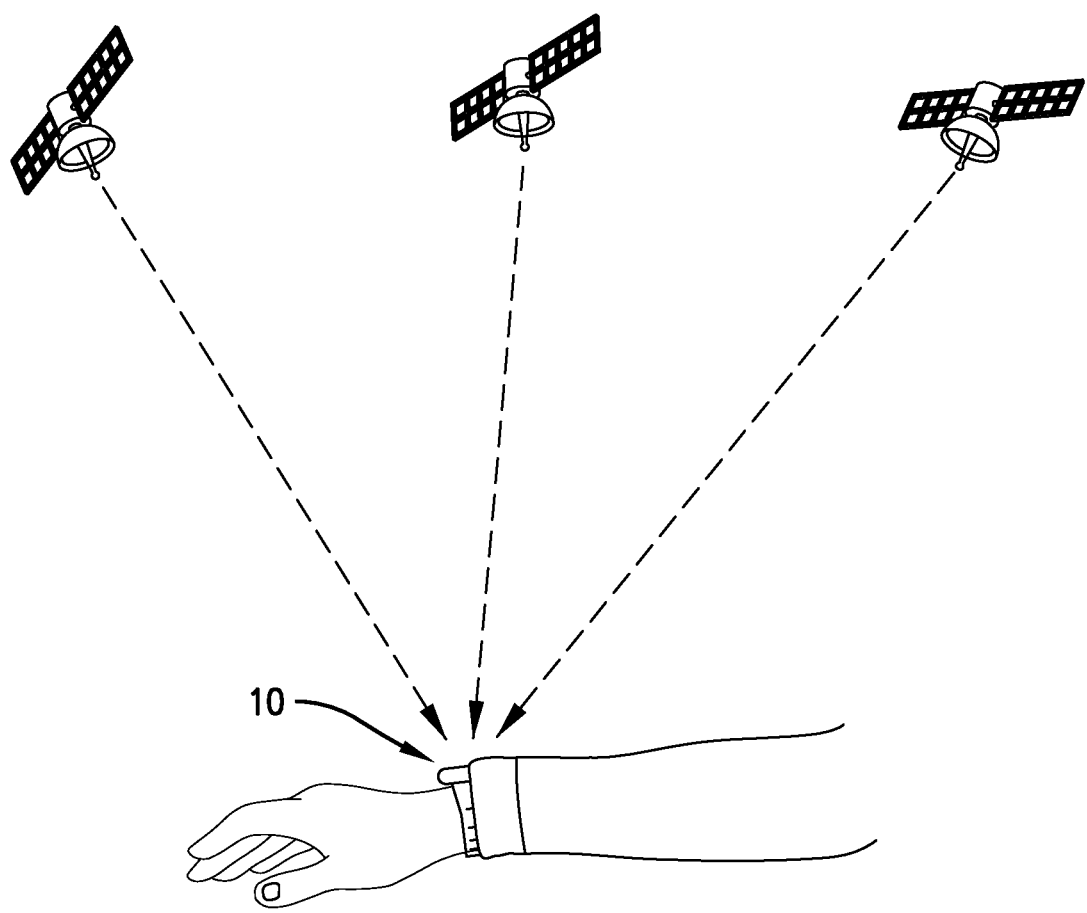
FIG. 7B is a side view of the user's arm wearing the electronic device while the user's sleeve is obstructing the reception of wireless signals from GNSS satellites.

The electronic device 10 may also compensate for events and situations that reduce the strength of the location wireless signals from the GNSS satellites. Referring to FIGS. 7A and 7B, in some situations, the user may be wearing a long sleeved shirt or a jacket during activity outdoors while the electronic device 10 is receiving the location wireless signals from the GNSS satellites. As shown in FIG. 7A, the user's sleeve may be pulled up away from the bezel 20 and away from the first aperture 44 and the second aperture 46 of the location determining antenna 26. In this situation, there is unlikely to be any degradation of the signals from the GNSS satellites. However, as shown in FIG. 7B, the user's sleeve often slides down to cover at least a portion of the bezel 20 and the first aperture 44 and the second aperture 46. In this case, the strength of the GPS L1 band wireless signal and/or the GPS L5 band wireless signal will likely be reduced. As a result, the strength of the first location electronic signal and/or the second location electronic signal may be reduced resulting from the obstruction above the first aperture 44 and the second aperture 46. Accordingly, the level or data value of the signal strength electronic signal from the location determining element 22 to the processing element 36 will be reduced below the signal strength threshold level. To compensate, the processing element 36 may reconfigure the first aperture tuning network 30 if the first location electronic signal strength is low and the second aperture tuning network 32 if the second location electronic signal strength is low. The processing element 36 may set the level or data value for the one or more switch control electronic signals for the first aperture tuning network 30 to open one or more switches S1-SN or close one or more switches S1-SN in order to change the resonant frequency of, i.e., retune, the first aperture 44 so that the signal strength of the first location electronic signal increases to an acceptable level. The processing element 36 may do the same for the second aperture tuning network 32 to retune the second aperture 46. The processing element 36 may stop changing the state of the switches S1-SN when the signal strength of the first location electronic signal and/or the second location electronic signal increases to an acceptable level. Or, the processing element 36 may revert back to the original switch setting if no improvement can be made. In addition, the processing element 36 may revert back to the original switch setting once the shirt sleeve, or other object, is no longer obstructing reception of the location wireless signals from the GNSS satellites.

Figure 8A:
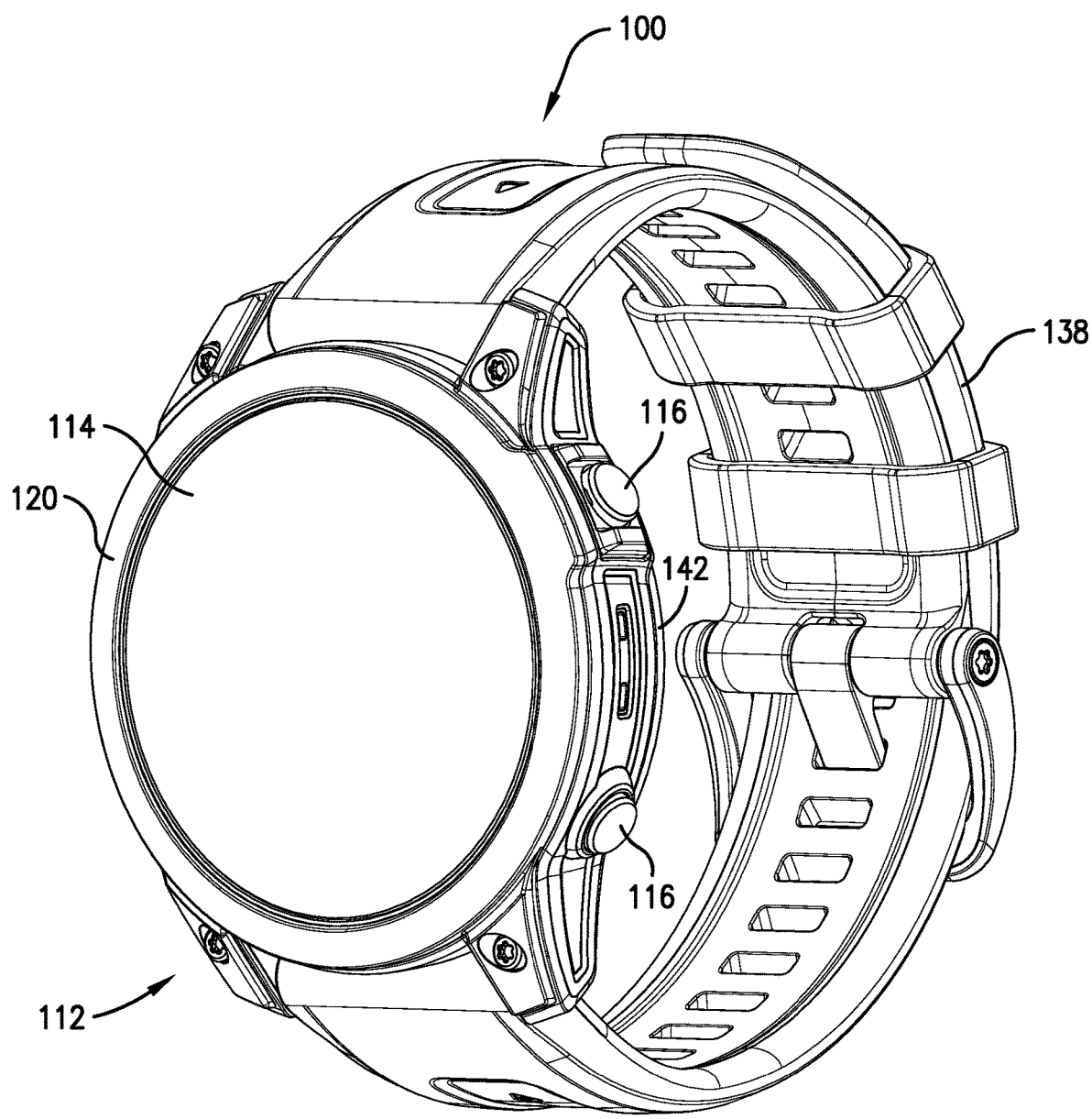
FIG. 8A is a front perspective view of a second embodiment of the wrist-worn electronic device.
Figure 8B:
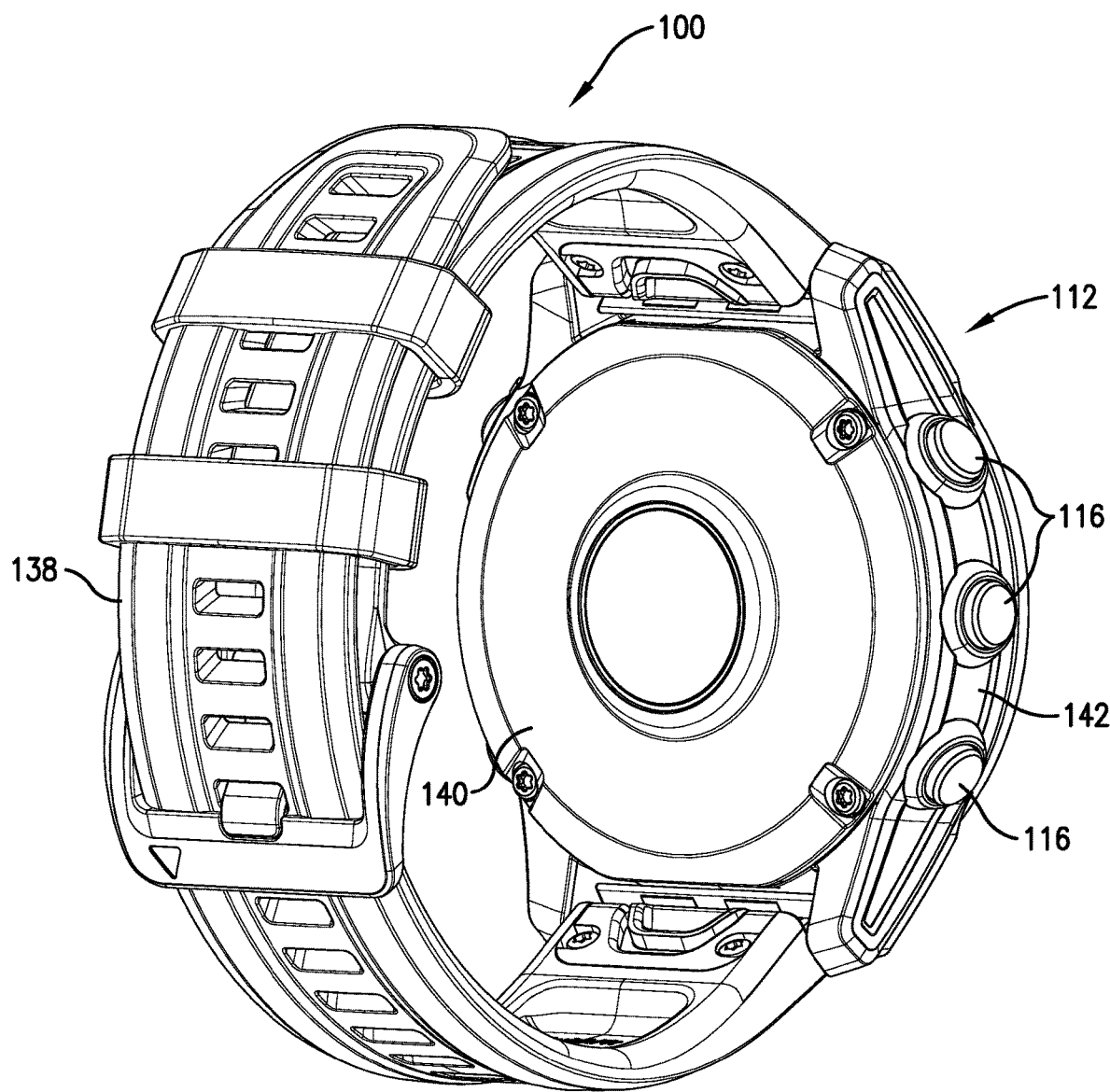
FIG. 8B is a rear perspective view of the second embodiment of the wrist-worn electronic device.
Figure 9:
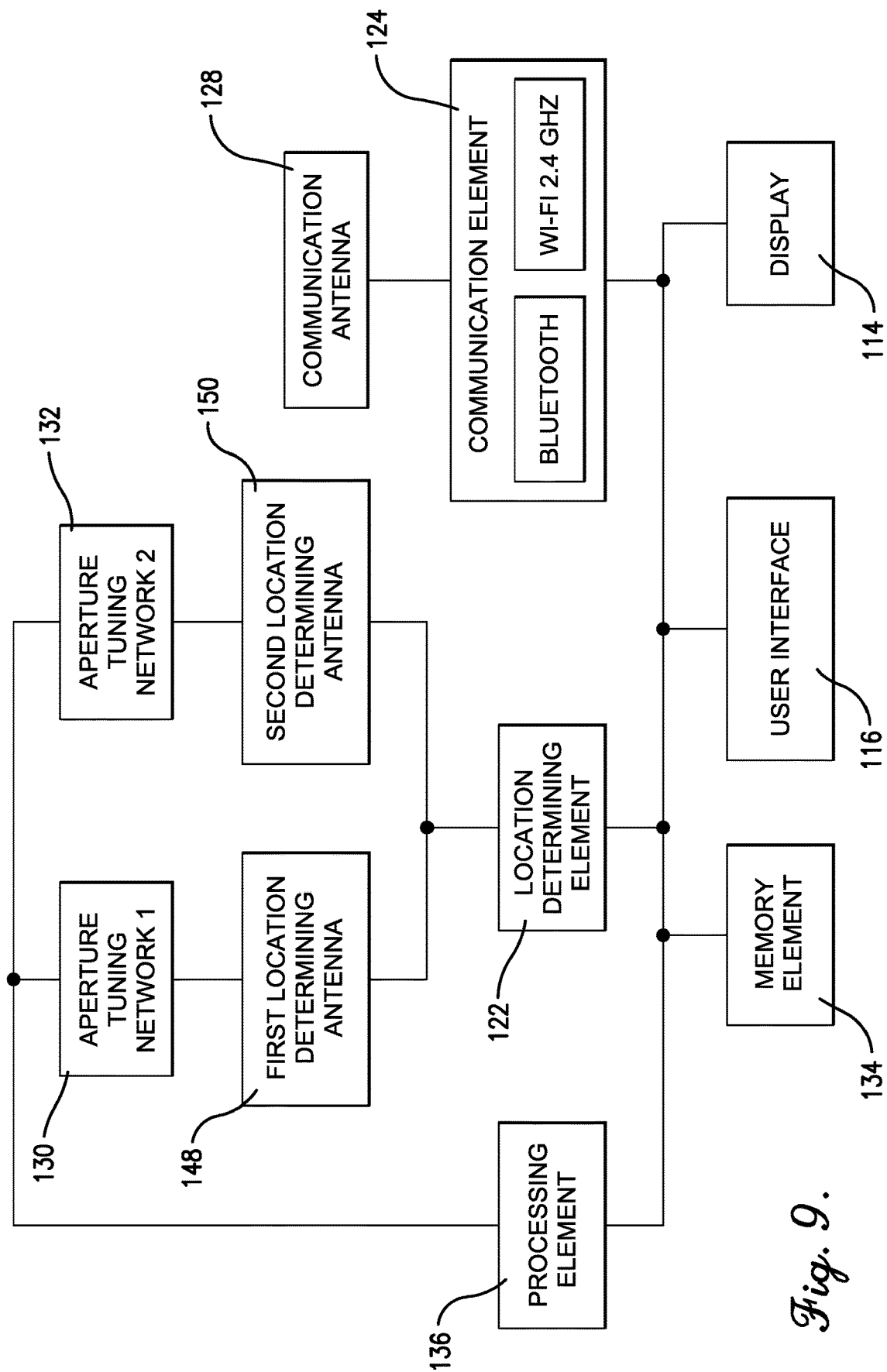
FIG. 9 is a schematic block diagram of various electronic components of the second embodiment of the wrist-worn electronic device.

The current technology provides another embodiment of the electronic device 100. The electronic device 100 comprises a housing 112 as shown in FIGS. 8A and 8B. The electronic device 100 further comprises the electronic components shown in FIG. 9 including a display 114, a user interface 116, a location determining element 122, a communication element 124, a communication antenna 128, a first aperture tuning network 130, a second aperture tuning network 132, a memory element 134, and a processing element 136, as well as a printed circuit board 118, a bezel 120, and a wrist band 138. Each of the aforementioned components is the same as, or very similar to, the like-named components discussed above for the electronic device 10. The primary difference between the electronic device 10 and the electronic device 100 is that electronic device 10 has the single location determining antenna 26 including the first aperture 44 and the second aperture 46 whereas the electronic device 100 has a first location determining antenna 148 and a second location determining antenna 150, each including a single aperture.

The housing 112 is the same as, or very similar to, the housing 12 and includes a bottom wall 140, at least one side wall 142, and an internal cavity.

Figure 10A:
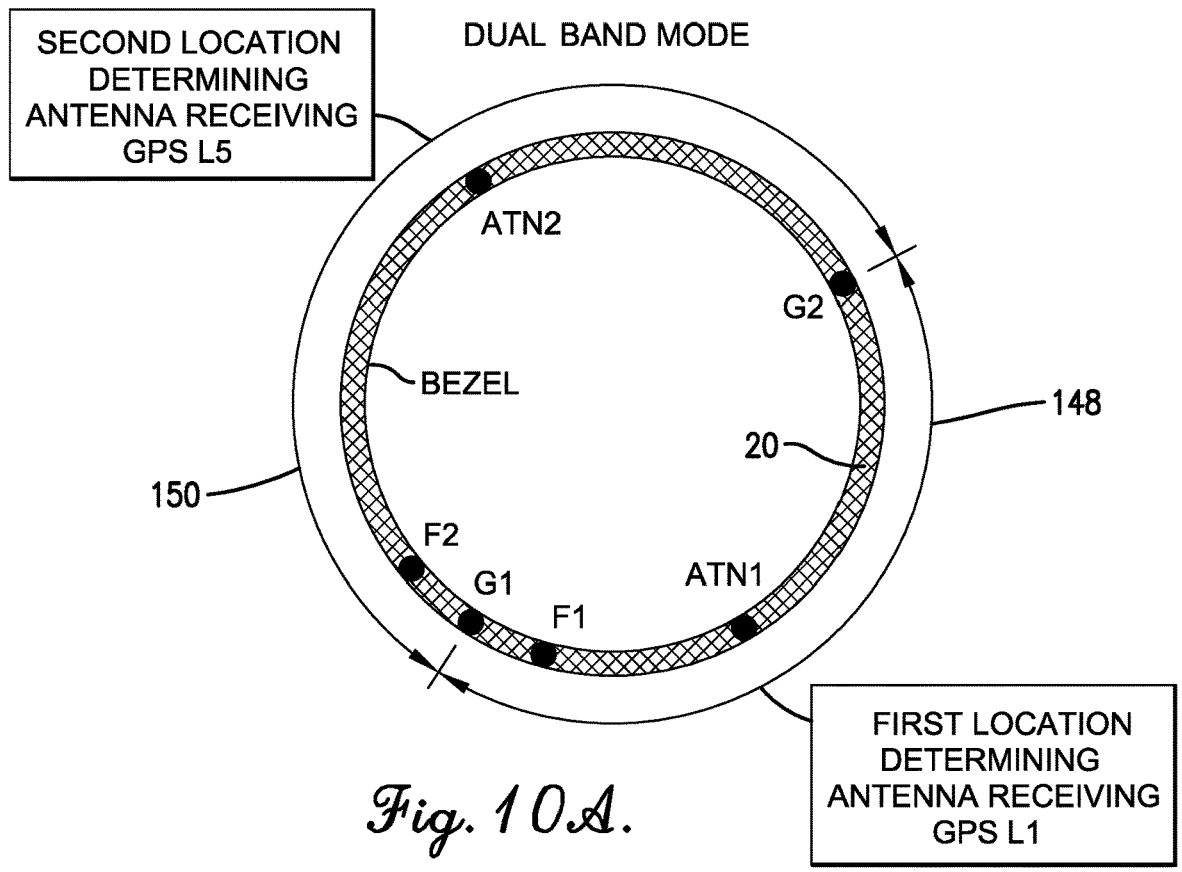
FIG. 10A is a top schematic view of the bezel including a first location determining antenna and a second location determining antenna while the second embodiment of the wrist-worn electronic device is operating in a configuration of a dual band mode.

Referring to FIG. 10A, the first location determining antenna 148 is formed by the bezel 120 and has a physical length that occupies a first portion of a circumference of the bezel 120 wherein the first portion of the circumference of the bezel 120 may range from approximately the 2 o'clock position extending clockwise to approximately the 7 o'clock position. When the electronic device 100 is in either the dual band mode or the single band mode, the first location determining antenna 148 is tuned (by the first aperture tuning network 130) to have an effective length that is proportional to, corresponds to, or varies according to, a half wavelength of the GPS L1 band, i.e., the first frequency band, which has a center frequency of approximately 1575 MHz. At this frequency, the effective length of the first location determining antenna 148 is roughly equivalent to the physical length, so that the effective length occupies the first portion of a circumference of the bezel 120. The first location determining antenna 148 includes a feed point (F1) through which the first location electronic signal is communicated, a first electronic ground point (G1) which is positioned at a first end of the first portion of the circumference of the bezel 120, and a second electronic ground point (G2) which is positioned at a second end, opposite the first end, of the first portion of the circumference of the bezel 120. Furthermore, the first location determining antenna 148 includes an aperture tuning network point (ATN1) for the electrical connection to a tuning electronic signal of the first aperture tuning network 130. The feed point F1 is electrically connected, through one electrically conductive element, to the location determining element 122 on the printed circuit board 118. The first electronic ground point G1 and the second electronic ground point G2 are electrically connected, each through one electrically conductive element, to electronic ground on the printed circuit board 118. The ATN1 point is electrically connected, through one electrically conductive element, to the tuning signal of the first aperture tuning network 130 on the printed circuit board 118.

The second location determining antenna 150 is also formed by the bezel 120 and has a physical length that occupies a second portion of the circumference of the bezel 120, as shown in FIG. 10A, wherein the second portion covers the remainder of the circumference of the bezel 120 and may range from approximately the 2 o'clock position extending counterclockwise to approximately the 7 o'clock position. When the electronic device 100 is in the dual band mode, the second location determining antenna 150 is tuned (by the second aperture tuning network 132) to have an effective length that is proportional to, corresponds to, or varies according to, a half wavelength of the GPS L5 band, i.e., the second frequency band, which has a center frequency of approximately 1175 MHz. At this frequency, the effective length of the second location determining antenna 150 is roughly equivalent to the physical length, so that the effective length occupies the second portion of a circumference of the bezel 120. The second location determining antenna 150 includes a feed point (F2) through which the second location electronic signal is communicated, the first electronic ground point (G1) which is positioned at a first end of the second portion of the circumference of the bezel 120, and the second electronic ground point (G2) which is positioned at a second end, opposite the first end, of the second portion of the circumference of the bezel 120. Furthermore, the second location determining antenna 150 includes an aperture tuning network point (ATN2) for the electrical connection to a tuning electronic signal of the second aperture tuning network 132. The feed point F2, the first electronic ground point G1, and the second electronic ground point G2 are electrically connected to the printed circuit board 18, as described above. The ATN2 point is electrically connected, through one electrically conductive element, to the tuning signal of the second aperture tuning network 132 on the printed circuit board 118.

Figure 10B:
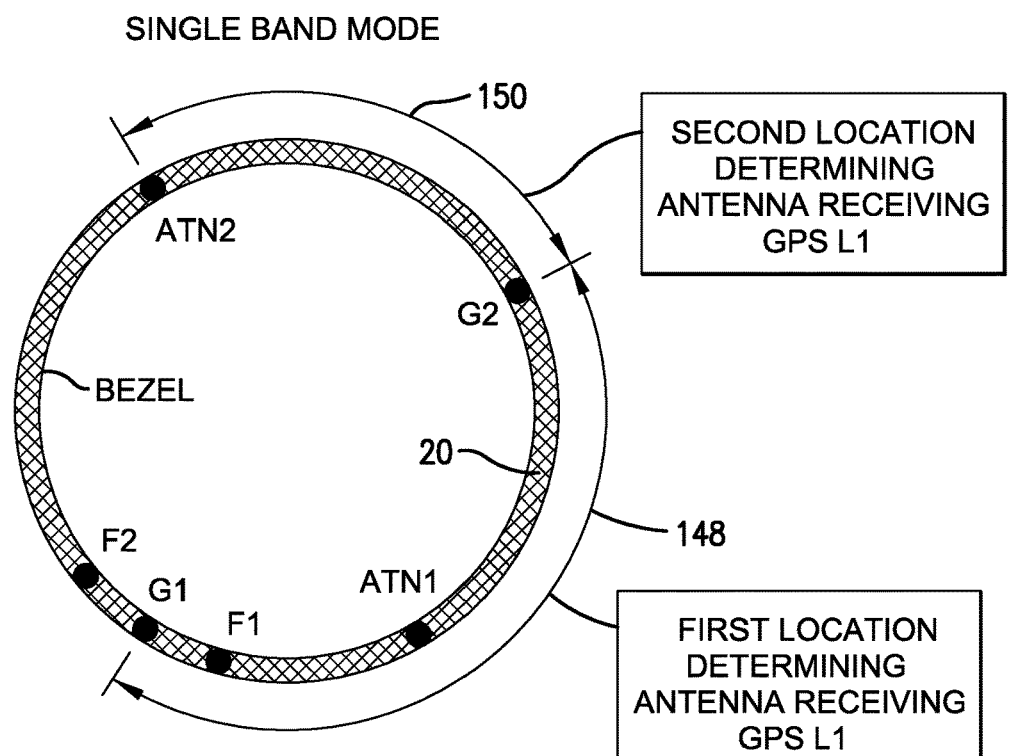
FIG. 10B is a top schematic view of the bezel including the first location determining antenna and the second location determining antenna while the second embodiment of the wrist-worn electronic device is operating in one configuration of a single band mode.
Figure 10C:
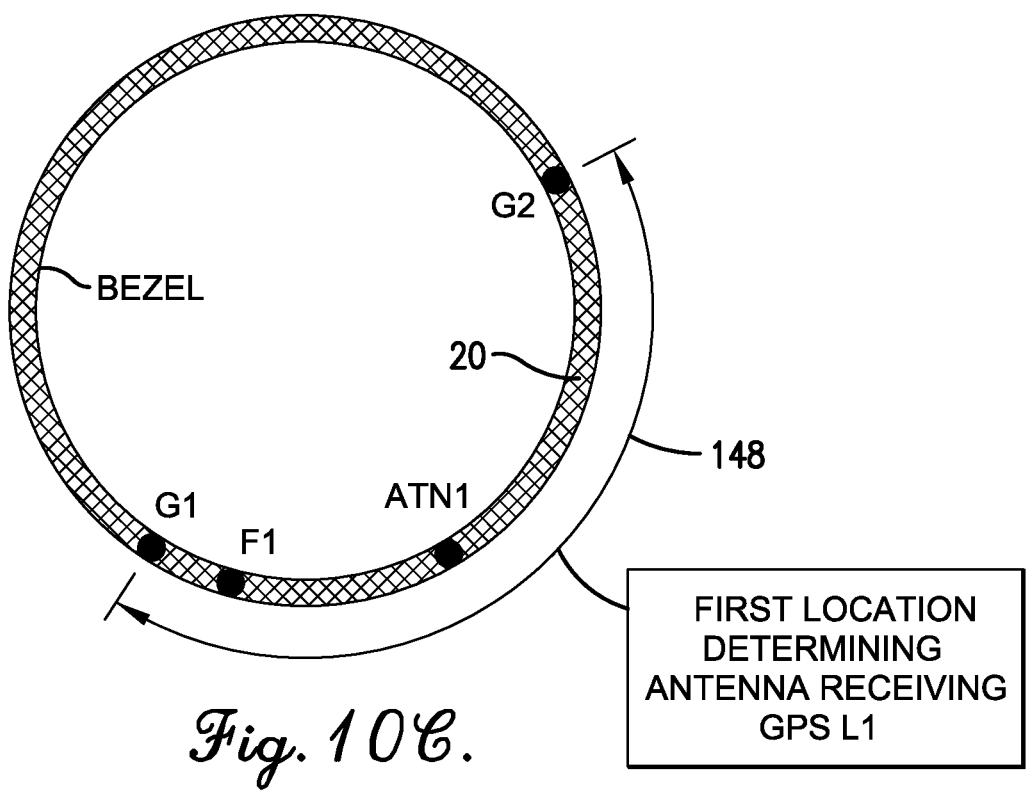
FIG. 10C is a top schematic view of the bezel including the first location determining antenna and the second location determining antenna while the second embodiment of the wrist-worn electronic device is operating in another configuration of the single band mode.

When the electronic device 100 is in the single band mode, in some embodiments, the second location determining antenna 150 is tuned (by the second aperture tuning network 132) to have an effective length that is proportional to, corresponds to, or varies according to, a half wavelength of the GPS L1 band. Thus, the effective length of the second location determining antenna 150 is reduced so that it occupies a third portion of the circumference of the bezel 120, which is smaller than the second portion and lies within the second portion, as shown in FIG. 10B. In other embodiments, the second location determining antenna 150 is not utilized. In these embodiments, only the first location determining antenna 26 is active, as shown in FIG. 10C.

Referring to FIG. 11A, a signal path for the first location electronic signal, which is generated by the first location determining antenna 148 in the dual band mode or the single band mode, is shown. The signal path includes a first path along the first portion of the circumference of the bezel 120 and a second path through one or more electrically conductive layers, perhaps including ground planes, of the printed circuit board 118. In addition, the signal path includes one or more electrically conductive traces on the printed circuit board 118 that electrically connect to the location determining element 122. Furthermore, the signal path includes a plurality of electrically conductive elements that provide electrical connection between the bezel 120 and the printed circuit board 118. Specifically, the signal path may include a first electrically conductive element positioned in the vicinity of the feed point F1 on the bezel 120, a second electrically conductive element positioned in the vicinity of the first electronic ground point G1 on the bezel 120, and a third electrically conductive element positioned in the vicinity of the second electronic ground point G2 on the bezel 20.

Referring to FIG. 11B, a signal path for the second location electronic signal, which is generated by the second location determining antenna 150 in the dual band mode, is shown. The signal path includes a first path along the second portion of the circumference of the bezel 120 and a second path through one or more electrically conductive layers, perhaps including ground planes, of the printed circuit board 118. In addition, the signal path includes one or more electrically conductive traces on the printed circuit board 118 that electrically connect the location determining element 122 to a first electrically conductive element which electrically connects to the feed point F2. Furthermore, the signal path shares the second, and third electrically conductive elements, associated with the first electronic ground point G1, and the second electronic ground point G2, respectively, with the first location determining antenna 148.

Referring to FIG. 11C, a signal path for the first location electronic signal, which is generated by the first location determining antenna 148 and the second location determining antenna 150 in the single band mode, is shown. The signal path includes a first path along the first portion of the circumference of the bezel 120 and the third portion of the circumference of the bezel 120. The signal path includes a second path through one or more electrically conductive layers, perhaps including ground planes, of the printed circuit board 118. In addition, the signal path includes one or more electrically conductive traces on the printed circuit board 118 that electrically connect to the location determining element 122. Furthermore, the signal path includes a plurality of electrically conductive elements that provide electrical connection between the bezel 120 and the printed circuit board 118. Specifically, the signal path may include a first electrically conductive element positioned in the vicinity of the feed point F1 on the bezel 120, a second electrically conductive element positioned in the vicinity of the feed point F2 on the bezel 120, a third electrically conductive element positioned in the vicinity of the first electronic ground point G1 on the bezel 120, and a fourth electrically conductive element positioned in the vicinity of the ATN2 point on the bezel 120.

The processing element 136 is programmed and/or configured to function the same as, or very similar to, the processing element 36. In addition, the electronic device 100 operates the same as, or very similar to, the electronic device 10, with the first location determining antenna 148 functioning the same as, or very similar to, the first aperture 44 and the second location determining antenna 150 functioning the same as, or very similar to, the second aperture 46.

Although the technology has been described with reference to the embodiments illustrated in the attached drawing figures, it is noted that equivalents may be employed, and substitutions made herein without departing from the scope of the technology as recited in the claims.

Having thus described various embodiments of the technology, what is claimed as new and desired to be protected by Letters Patent includes the following:

1. A wrist-worn electronic device comprising:
   a housing including a bottom wall configured to contact a wearer's wrist and a side wall coupled to the bottom wall;
   a bezel formed at least partially from electrically conductive material and positioned along an upper edge of the side wall;
   an antenna including a first aperture and a second aperture, the antenna configured to operate in one of two operating modes including
      a dual band mode in which the first aperture receives a first global navigation satellite system (GNSS) wireless signal at a first frequency band and is formed by a first portion of a circumference of the bezel, and the second aperture receives a second GNSS wireless signal at a second frequency band and is formed by a second portion of the circumference of the bezel, and
      a single band mode in which the first aperture and the second aperture each receive the first GNSS wireless signal, the first aperture is formed by the first portion of the circumference of the bezel, and the second aperture is formed by a third portion of the circumference of the bezel located within the second portion of the circumference of the bezel; and
   an aperture tuning network having an adjustable configuration wherein adjustment of the adjustable configuration changes the operating mode of the antenna.

2. The wrist-worn electronic device of claim 1, further comprising a location determining element, wherein the location determining component is configured to determine a current geolocation of the wrist-worn electronic device based on the first GNSS wireless signal when the antenna is operating in the single band mode, and wherein the location determining component is configured to determine the current geolocation of the wrist-worn electronic device based on the first GNSS wireless signal and the second GNSS wireless signal the antenna is operating in the dual band mode.

3. The wrist-worn electronic device of claim 1, wherein the first aperture includes an electronic signal feed connection positioned at a first point on the bezel, a first electronic ground connection positioned at a second point on the bezel, and a second electronic ground connection positioned at a third point on the bezel, and the end points of the first portion of the circumference of the bezel include the first electronic ground connection and the second electronic ground connection.

4. The wrist-worn electronic device of claim 3, wherein in the dual band mode, the second aperture includes the electronic signal feed connection, the first electronic ground connection, and the second electronic ground connection each shared with the first aperture and a connection to the aperture tuning network positioned at a fourth point along the second portion of the circumference of the bezel, and the end points of the second portion of the circumference of the bezel include the first electronic ground connection and the second electronic ground connection.

5. The wrist-worn electronic device of claim 4, wherein in the single band mode, the second aperture includes the electronic signal feed connection and the second electronic ground connection each shared with the first aperture and the connection to the aperture tuning network, and the end points of the third portion of the circumference of the bezel include the second electronic ground connection and the connection to the aperture tuning network.

6. The wrist-worn electronic device of claim 5, further comprising a printed circuit board providing electric ground and being electrically connected to the electronic signal feed connection, the first electronic ground connection, and the second electronic ground connection.

7. The wrist-worn electronic device of claim 1, wherein the aperture tuning network adjusts a resonant frequency of the second aperture such that in the dual band mode, the aperture tuning network adjusts the resonant frequency of the second aperture to the second frequency band, and in the single band mode, the aperture tuning network adjusts the resonant frequency of the second aperture to the first frequency band.

8. The wrist-worn electronic device of claim 1, wherein the aperture tuning network includes a switch configured to selectively function in either a first state or a second state such that when the switch is functioning in the first state, the antenna operates in the dual band mode, and when the switch is functioning in the second state, the antenna operates in the single band mode.

9. The wrist-worn electronic device of claim 1, wherein
   in the dual band mode, the first aperture has an effective length of approximately half a wavelength of the first GNSS wireless signal and the second aperture has an effective length of approximately half a wavelength of the second GNSS wireless signal, and
   in the single band mode, the first aperture and the second aperture in combination have an effective length of approximately one wavelength of the first GNSS wireless signal.

10. A wrist-worn electronic device comprising:
    a housing including a bottom wall configured to contact a wearer's wrist and a side wall coupled to the bottom wall;
    a bezel formed at least partially from electrically conductive material and positioned along an upper edge of the side wall;
    a first antenna and a second antenna in combination configured to operate in one of two operating modes including
       a dual band mode in which the first antenna receives a first global navigation satellite system (GNSS) wireless signal at a first frequency band and includes a first aperture formed by a first portion of a circumference of the bezel and the second antenna receives a second GNSS wireless signal at a second frequency band and includes a second aperture formed by a second portion of the circumference of the bezel, and a single band mode in which the first antenna and a third portion of the circumference of the bezel each receive the first GNSS wireless signal, the first antenna includes the first aperture formed by the first portion of the circumference of the bezel and the third portion of the circumference of the bezel is located within the second portion of the circumference of the bezel; and an aperture tuning network having an adjustable configuration wherein adjustment of the adjustable configuration changes the operating mode of the antennas.

11. The wrist-worn electronic device of claim 10, further comprising a location determining element, wherein the location determining component is configured to determine a current geolocation of the wrist-worn electronic device based on the first GNSS wireless signal when the antennas are operating in the single band mode, and wherein the location determining component is configured to determine the current geolocation of the wrist-worn electronic device based on the first GNSS wireless signal and the second GNSS wireless signal the antennas are operating in the dual band mode.

12. The wrist-worn electronic device of claim 10, wherein the first aperture includes an electronic signal feed connection positioned at a first point on the bezel, a first electronic ground connection positioned at a second point on the bezel, and a second electronic ground connection positioned at a third point on the bezel, and the end points of the first portion of the circumference of the bezel include the first electronic ground connection and the second electronic ground connection.

13. The wrist-worn electronic device of claim 12, wherein in the dual band mode, the second portion of the circumference of the bezel includes the electronic signal feed connection, the first electronic ground connection, and the second electronic ground connection each shared with the first aperture and a connection to the aperture tuning network positioned at a fourth point along the second portion of the circumference of the bezel, and the end points of the second portion of the circumference of the bezel include the first electronic ground connection and the second electronic ground connection.

14. The wrist-worn electronic device of claim 13, wherein in the single band mode, the third portion of the circumference of the bezel includes the electronic signal feed connection and the second electronic ground connection each shared with the first aperture and the connection to the aperture tuning network, and the end points of the third portion of the circumference of the bezel include the second electronic ground connection and the connection to the aperture tuning network.

15. The wrist-worn electronic device of claim 14, further comprising a printed circuit board providing electric ground and being electrically connected to the electronic signal feed connection, the first electronic ground connection, and the second electronic ground connection.

16. The wrist-worn electronic device of claim 10, wherein the aperture tuning network adjusts a resonant frequency of the second aperture such that in the dual band mode, the aperture tuning network adjusts the resonant frequency of the second aperture to the second frequency band, and in the single band mode, the aperture tuning network adjusts the resonant frequency of the second aperture to the first frequency band.

17. The wrist-worn electronic device of claim 10, wherein in the dual band mode, the first antenna has an effective length of approximately half a wavelength of the first GNSS wireless signal and the second antenna has an effective length of approximately half a wavelength of the second GNSS wireless signal, and in the single band mode, the first antenna and the second antenna in combination have an effective length of approximately one wavelength of the first GNSS wireless signal.

18. A wrist-worn electronic device comprising:

a housing including a bottom wall configured to contact a wearer's wrist and a side wall coupled to the bottom wall;

a bezel formed at least partially from electrically conductive material and positioned along an upper edge of the side wall;

an antenna configured to receive global navigation satellite system (GNSS) wireless signals, the antenna including a first aperture formed by a first portion of a circumference of the bezel, the first aperture configured to output a first electronic signal, and a second aperture formed by a second portion of a circumference of the bezel, the second aperture configured to output a second electronic signal;

a first aperture tuning network having an adjustable configuration which configures the first aperture to have a resonant frequency at a first frequency value;

a second aperture tuning network having an adjustable configuration which configures the second aperture to have a resonant frequency at a second frequency value; and a processing element configured and/or programmed to output a first configuration signal to be received by the first aperture tuning network, the first configuration signal configured to adjust the configuration of the first aperture tuning network if a signal strength of the first electronic signal is less than a threshold value, and output a second configuration signal to be received by the second aperture tuning network, the second configuration signal configured to adjust the configuration of the second aperture tuning network if a signal strength of the second electronic signal is less than the threshold value.

19. The wrist-worn electronic device of claim 18, wherein the first aperture tuning network includes a first variable value of electrical inductance and the first value of the electrical inductance varies according to the first configuration signal, and the second aperture tuning network includes a second variable value of electrical inductance and the second value of the electrical inductance varies according to the second configuration signal.

20. The wrist-worn electronic device of claim 18, wherein the first aperture tuning network includes a first variable value of electrical capacitance and the first value of the electrical capacitance varies according to the first configuration signal, and the second aperture tuning network includes a second variable value of electrical capacitance and the second value of the electrical capacitance varies according to the second configuration signal.

\* \* \* \* \*